United States Patent
Mueller et al.

(10) Patent No.: US 7,802,717 B2
(45) Date of Patent: Sep. 28, 2010

(54) ELECTRONIC IMAGE CASH LETTER MONITORING

(75) Inventors: Randall Lee Mueller, Kansas City, MO (US); Thomas Edwin Schaadt, Westerville, OH (US); Steven Joseph Harris, Worthington, OH (US); Eric Lendl, Bedford, TX (US); V. Srinivas Nori, Norcross, GA (US); Steven Q. Purser, Plano, TX (US)

(73) Assignees: Federal Reserve Bank of Dallas, Dallas, TX (US); Federal Reserve Bank of Kansas City, Kansas City, MO (US); Federal Reserve Bank of Atlanta, Atlanta, GA (US); Federal Reserve Bank of Cleveland, Cleveland, OH (US)

( * ) Notice: Subject to any disclaimer, the term of this patent is extended or adjusted under 35 U.S.C. 154(b) by 881 days.

(21) Appl. No.: 11/482,360

(22) Filed: Jul. 7, 2006

(65) Prior Publication Data
US 2007/0235518 A1    Oct. 11, 2007

Related U.S. Application Data

(60) Provisional application No. 60/697,279, filed on Jul. 7, 2005.

(51) Int. Cl.
*G06Q 40/00* (2006.01)
*G07D 11/00* (2006.01)
*G07F 19/00* (2006.01)

(52) U.S. Cl. .................................... 235/379

(58) Field of Classification Search .................. 235/379, 235/375, 449, 487, 493; 705/45
See application file for complete search history.

(56) References Cited

U.S. PATENT DOCUMENTS

| | | | |
|---|---|---|---|
| 4,264,808 A | 4/1981 | Owens et al. |
| 4,270,042 A | 5/1981 | Case |
| 4,523,330 A | 6/1985 | Cain |
| 4,694,397 A | 9/1987 | Grant et al. |
| 4,823,264 A | 4/1989 | Deming |
| 4,948,174 A | 8/1990 | Thomson et al. |
| 4,974,878 A | 12/1990 | Josephson |
| 5,038,283 A | 8/1991 | Caveney |
| 5,120,944 A | 6/1992 | Kern et al. |

(Continued)

OTHER PUBLICATIONS

Excerpt of Bank of America checking account statement, with personal information redacted, Aug. 2008.

(Continued)

*Primary Examiner*—Edwyn Labaze
(74) *Attorney, Agent, or Firm*—King & Spalding

(57) ABSTRACT

Monitoring an electronic check processing status of an image cash letter ("ICL") and items in the ICL includes processing each ICL item by performing at least one electronic check processing event in connection with the item. For each electronic check processing event and for each item, a record comprising information related to a status of the electronic check processing event is created. Each record is associated with the corresponding item and the ICL. A status of each item can be determined based on the information stored in the records corresponding to that item. A status of the ICL can be determined based on the status of the items from the ICL.

29 Claims, 8 Drawing Sheets

U.S. PATENT DOCUMENTS

| | | |
|---|---|---|
| 5,121,945 A | 6/1992 | Thomson et al. |
| 5,187,750 A | 2/1993 | Behera |
| 5,198,975 A | 3/1993 | Baker et al. |
| 5,237,159 A | 8/1993 | Stephens et al. |
| 5,265,007 A | 11/1993 | Barnhard, Jr. et al. |
| 5,373,550 A | 12/1994 | Campbell et al. |
| 5,412,190 A | 5/1995 | Josephson et al. |
| 5,583,759 A | 12/1996 | Geer |
| 5,600,732 A | 2/1997 | Ott et al. |
| 5,668,897 A | 9/1997 | Stolfo |
| 5,677,955 A | 10/1997 | Doggett et al. |
| 5,680,611 A | 10/1997 | Rail et al. |
| 5,687,250 A | 11/1997 | Curley et al. |
| 5,689,579 A | 11/1997 | Josephson |
| 5,692,065 A | 11/1997 | Prakash et al. |
| 5,754,674 A | 5/1998 | Ott et al. |
| 5,783,808 A | 7/1998 | Josephson |
| 5,790,717 A | 8/1998 | Judd |
| 5,819,236 A | 10/1998 | Josephson |
| 5,832,140 A | 11/1998 | Stapleton et al. |
| 5,930,778 A * | 7/1999 | Geer ............................ 705/45 |
| 5,937,084 A | 8/1999 | Crabtree et al. |
| 5,940,524 A | 8/1999 | Murayama et al. |
| 5,963,654 A | 10/1999 | Prakash et al. |
| 6,019,282 A | 2/2000 | Thompson et al. |
| 6,097,834 A | 8/2000 | Krouse et al. |
| 6,115,509 A | 9/2000 | Yeskel |
| 6,170,744 B1 | 1/2001 | Lee et al. |
| 6,236,756 B1 | 5/2001 | Kimura et al. |
| 6,243,689 B1 | 6/2001 | Norton |
| 6,351,546 B1 | 2/2002 | Murayama et al. |
| 6,351,553 B1 | 2/2002 | Hayosh |
| 6,450,403 B1 | 9/2002 | Martens et al. |
| 6,571,000 B1 | 5/2003 | Rasmussen et al. |
| 6,577,761 B1 | 6/2003 | Kanno et al. |
| 6,585,775 B1 | 7/2003 | Cosentino et al. |
| 6,658,139 B1 | 12/2003 | Cookingham et al. |
| 6,717,592 B2 | 4/2004 | Gusler et al. |
| 6,792,133 B2 | 9/2004 | Ott et al. |
| 6,850,950 B1 | 2/2005 | Clarke et al. |
| 6,912,297 B2 | 6/2005 | Scott et al. |
| 6,963,885 B2 | 11/2005 | Calkins et al. |
| 6,996,263 B2 | 2/2006 | Jones et al. |
| 7,000,828 B2 | 2/2006 | Jones |
| 7,066,668 B2 | 6/2006 | Sandison et al. |
| 7,066,669 B2 | 6/2006 | Lugg |
| 7,082,216 B2 | 7/2006 | Jones et al. |
| 7,092,560 B2 | 8/2006 | Jones et al. |
| 7,099,845 B2 | 8/2006 | Higgins et al. |
| 7,120,606 B1 | 10/2006 | Ranzini et al. |
| 7,167,580 B2 | 1/2007 | Klein et al. |
| 7,283,656 B2 | 10/2007 | Blake et al. |
| 7,386,511 B2 | 6/2008 | Buchanan et al. |
| 7,539,646 B2 | 5/2009 | Gilder et al. |
| 7,546,275 B1 | 6/2009 | Herzberg et al. |
| 2001/0039534 A1 | 11/2001 | Keene |
| 2001/0051921 A1 | 12/2001 | Garner, IV et al. |
| 2002/0150279 A1 | 10/2002 | Scott et al. |
| 2003/0158811 A1 | 8/2003 | Sanders et al. |
| 2003/0202690 A1 | 10/2003 | Jones et al. |
| 2003/0208421 A1 * | 11/2003 | Vicknair et al. ............... 705/35 |
| 2003/0225704 A1 | 12/2003 | Park et al. |
| 2004/0030621 A1 | 2/2004 | Cobb |
| 2004/0068464 A1 | 4/2004 | Buchanan et al. |
| 2004/0109596 A1 | 6/2004 | Doran |
| 2004/0133516 A1 | 7/2004 | Buchanan et al. |
| 2004/0143621 A1 | 7/2004 | Fredrickson et al. |
| 2004/0148235 A1 | 7/2004 | Craig et al. |
| 2004/0181485 A1 * | 9/2004 | Finch et al. ................... 705/45 |
| 2004/0236688 A1 | 11/2004 | Bozeman |
| 2005/0018896 A1 | 1/2005 | Heit et al. |
| 2005/0044043 A1 | 2/2005 | Gooding et al. |
| 2005/0071283 A1 | 3/2005 | Randle et al. |
| 2005/0080719 A1 | 4/2005 | Sellen et al. |
| 2005/0080738 A1 | 4/2005 | Sellen et al. |
| 2005/0086136 A1 | 4/2005 | Love et al. |
| 2005/0097046 A1 | 5/2005 | Singfield |
| 2005/0097050 A1 | 5/2005 | Orcutt |
| 2005/0109833 A1 | 5/2005 | Page |
| 2005/0129300 A1 | 6/2005 | Sandison et al. |
| 2005/0139670 A1 * | 6/2005 | McGlamery et al. ......... 235/449 |
| 2005/0144131 A1 | 6/2005 | Aziz |
| 2005/0171899 A1 | 8/2005 | Dunn et al. |
| 2005/0175221 A1 | 8/2005 | Scott et al. |
| 2005/0203857 A1 | 9/2005 | Friedman |
| 2005/0211763 A1 | 9/2005 | Sgambati et al. |
| 2005/0213805 A1 | 9/2005 | Blake et al. |
| 2005/0220324 A1 | 10/2005 | Klein et al. |
| 2005/0238252 A1 | 10/2005 | Prakash et al. |
| 2005/0243378 A1 | 11/2005 | Klein et al. |
| 2005/0243379 A1 | 11/2005 | Klein et al. |
| 2005/0244035 A1 | 11/2005 | Klein et al. |
| 2005/0252960 A1 | 11/2005 | Murata |
| 2005/0256839 A1 | 11/2005 | Leong et al. |
| 2005/0281448 A1 | 12/2005 | Lugg |
| 2006/0006222 A1 | 1/2006 | Brey et al. |
| 2006/0023930 A1 | 2/2006 | Patel et al. |
| 2006/0045321 A1 | 3/2006 | Yu |
| 2006/0045600 A1 | 3/2006 | Lugg |
| 2006/0080245 A1 | 4/2006 | Bahl et al. |
| 2006/0106717 A1 | 5/2006 | Randle et al. |
| 2006/0112013 A1 | 5/2006 | Maloney |
| 2006/0118613 A1 | 6/2006 | McMann et al. |
| 2006/0133277 A1 * | 6/2006 | Carozza et al. .............. 370/235 |
| 2006/0167784 A1 | 7/2006 | Hoffberg |
| 2006/0182331 A1 | 8/2006 | Gilson et al. |
| 2006/0182332 A1 | 8/2006 | Weber |
| 2006/0184441 A1 | 8/2006 | Haschka et al. |
| 2006/0186194 A1 | 8/2006 | Richardson et al. |
| 2006/0188310 A1 | 8/2006 | Sandison et al. |
| 2006/0188311 A1 | 8/2006 | Lugg |
| 2006/0191998 A1 | 8/2006 | Mueller et al. |
| 2006/0206427 A1 | 9/2006 | Love et al. |
| 2006/0212391 A1 | 9/2006 | Norman et al. |
| 2006/0229987 A1 | 10/2006 | Leekley |
| 2006/0237526 A1 | 10/2006 | Mueller et al. |
| 2006/0248009 A1 | 11/2006 | Hicks et al. |
| 2006/0280354 A1 * | 12/2006 | Murray ....................... 382/137 |
| 2007/0095888 A1 | 5/2007 | Mueller et al. |
| 2007/0156438 A1 | 7/2007 | Popadic et al. |
| 2007/0244782 A1 | 10/2007 | Chimento |
| 2007/0288382 A1 | 12/2007 | Narayanan et al. |
| 2008/0000687 A1 | 1/2008 | Xu et al. |
| 2008/0097899 A1 | 4/2008 | Jackson et al. |
| 2008/0103790 A1 | 5/2008 | Abernethy et al. |
| 2008/0159655 A1 | 7/2008 | Breeden et al. |
| 2008/0162319 A1 | 7/2008 | Breeden et al. |
| 2008/0162320 A1 | 7/2008 | Mueller et al. |
| 2008/0162321 A1 | 7/2008 | Breeden et al. |
| 2008/0162322 A1 | 7/2008 | Breeden et al. |
| 2008/0247629 A1 | 10/2008 | Gilder et al. |

OTHER PUBLICATIONS

"Vision, Strategy & Approach to Image Quality & Archive Integrity, A Review of Carreker's Current Initiatives Towards Image Quality Detection & Resolution", Federal Reserve System, Aug. 19, 2003, Copyright © 2003 Carreker Corporation, pp. 1-43.

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

"What is Check21?", VSOFT Corporation, available at http://www.vsoftcorp.com/check21.htm.

"Check21 Cash Letter: Clear Check Images Rather than Paper Checks", SYMITAR, available at http://www.symitar.com/Default.aspx?P=2d1883d0-91be-496d-9047-64a83378dd36.

"Creating, Editing and Using Image Cash Letter, X9.37 Files", All My Papers, available at http://www.ggx.com/solutions_7.htm.

Holcomb, Notice 04-57, Aug. 27, 2004, Federal Reserve Bank of Dallas, 6 pages.

Microsoft Computer Dictionary, Fifth Edition, Microsoft Press, Copyright 2002, p. 258, 3 pages.

"CONIX Systems Launches Dupe Detective: New Product Eliminates Cost and Liability of Processing Items Multiple Times", Business Wire, May 18, 2006, 3 pages.

"Alogent Offering Sierra Solution for Image Cash Letter Deposits: Image Cash Letter and Back Office Conversion Capabilities Optimized for Large Merchants and Correspondent Banks", Business Wire, Oct. 10, 2005, p. 1, 2 pages.

"Taking Control of Payment Duplication: An In-Depth Look at a Serious Challenge Created by Check 21", Conix Systems, Inc., White Papers, Sep. 8, 2006, Retrieved Feb. 3, 2009, http://www.conix.com/news/default.asp, 9 pages.

Greene, U.S. Appl. No. 11/482,379, Office Action, filed Sep. 30, 2009, 29 pages.

Greene, U.S. Appl. No. 11/482,379, Office Action, filed Jun. 10, 2009, 8 pages.

Greene, U.S. Appl. No. 11/482,379, Office Action, filed Sep. 29, 2008, 5 pages.

Captovation Announces the Release of Check Capture 5.1; Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

* cited by examiner

ELECTRONIC IMAGE CASH LETTER MONITORING

RELATED PATENT APPLICATIONS

This patent application claims priority under 35 U.S.C. §119 to U.S. Provisional Patent Application No. 60/697,279, entitled "Electronic Image Cash Letter Monitoring and Balancing," filed Jul. 7, 2005. This patent application also is related to U.S. patent application Ser. No. 11/482,379, entitled "Electronic Image Cash Letter Balancing," filed Jul. 7, 2006; U.S. patent application Ser. No. 11/362,344, entitled "Cash Letter Print Streams with Audit Data," filed Feb. 22, 2006; and U.S. patent application Ser. No. 11/362,343, entitled "Expanded Mass Data Sets for Electronic Check Processing," filed Feb. 22, 2006. The complete disclosure of the above-identified priority and related applications is hereby fully incorporated herein by reference.

FIELD OF THE INVENTION

The invention relates generally to check processing and more particularly to monitoring the processing status of electronic image cash letters ("ICLs") and items in the ICLs during electronic check processing and providing information regarding the processing status of the ICLs and items.

BACKGROUND OF THE INVENTION

Effective Oct. 28, 2004, the Check Clearing for the 21st Century Act ("the Act") improves the ability of banks to use electronic images of paper checks by, for example, submitting those images, along with associated information, for electronic processing. Under the Act, if a receiving financial institution ("RI") or its customer requires a paper check, a paper image replacement document ("IRD"), such as a paper "substitute check," may be created from an electronic check image and associated electronic information. Under the Act, a substitute check meeting specified requirements is the legal equivalent of an original paper check, and an RI is required to accept the substitute check for payment. This process enables banks to reduce the costs and inconveniences associated with physically handling and transporting original paper checks.

The terms "substitute check" and "IRD" generally are used interchangeably herein to refer to any electronic or paper document that can be used for electronic payment processing purposes, whether or not the document is the legal equivalent of a paper check negotiable instrument. The terms "bank" and "RI" generally are used herein to refer to any party performing conventional or electronic check processing at any stage, including depositing and receiving institutions, their non-bank subsidiaries and affiliates, and any non-bank third party agents that provide processing services to banks.

Typically, each electronic check is received for processing in an electronic file, which includes one or more electronic image cash letters ("ICLs"). Each ICL includes one or more bundles of items (checks) to be processed. Each ICL can comprise forward items and/or return items. Upon receipt, the electronic file and each ICL and item contained therein proceed through a number of electronic check processing points. For example, the electronic processing points typically include: (1) verifying the format and/or contents of the electronic file; (2) identifying an RI for each item in the file; (3) aggregating the items by RI into at least one new, outgoing ICL for each RI; and (4) presenting each outgoing ICL to its corresponding RI via electronic or paper means. Typically, items from a particular incoming ICL are presented in multiple different outgoing ICLs.

At any electronic processing point, an ICL and/or an item may fail to process correctly. For example, during presentment of an outgoing ICL, an item may fail to print. To date, banks have been unable to monitor ICLs and items during electronic processing. In particular, banks have been unable to determine the processing status of each ICL and item therein, including whether each ICL and item was processed correctly, and if not, at which processing point it failed. Thus, banks have been unable to determine whether each item in each incoming ICL has been presented in a corresponding, outgoing ICL.

Oftentimes, such inability forces banks to process particular items multiple times. For example, where an RI has not received a particular item within a certain timeframe, the RI may request reprocessing of the item. Because the RI and the processing bank cannot determine whether the item has failed to process, or rather, is still processing, the banks typically assume that it failed to process. If the banks' assumption is incorrect, the item is needlessly reprocessed, wasting resources and creating confusion when both items ultimately are presented to the RI.

In the traditional, paper processing arena, each check could be seen and touched throughout processing. Determining whether a check was processed or identifying the current stage of processing for a particular check simply required looking in trays in various bank processing stations. Because Check 21 processing takes place electronically, banks do not have physical points at which they can make such determinations.

Thus, a need exists in the art for monitoring electronic ICLs and items during electronic check processing. Specifically, a need exists in the art for determining whether each ICL and item processed correctly, and if not, at which processing point it failed. In addition, a need exists in the art for balancing each incoming ICL by determining whether each item in the incoming ICL has been presented in a corresponding, outgoing ICL. A further need exists in the art for determining whether each item in a particular outgoing ICL has been processed multiple times.

SUMMARY OF THE INVENTION

The invention provides systems and methods for processing checks under the Act. Specifically, the invention provides systems and methods for monitoring the processing status of electronic image cash letters ("ICLs") and items in the ICLs during electronic check processing.

In one aspect of the invention, a data capture module of a check processor can receive an electronic ICL file including at least one ICL. A tracking module of the check processor can monitor the processing statuses of the ICL(s) and the items in the ICL(s) ("items" or "ICL items") during various electronic check processing events. For example, the electronic check processing events can include verifying the format and/or contents of the electronic ICL file, and, for each item, storing an electronic check image corresponding to the item in an image file, storing financial data corresponding to the item in a financial data file, storing addenda data corresponding to the item in an addenda data file, conducting a reject/repair analysis of the financial data file, creating a substitute check file corresponding to the item, creating a new ICL comprising the substitute check file, and presenting the item to a receiving institution for payment.

At each electronic check processing point, the tracking module can store a record comprising information related to the electronic check processing point. For example, the record can comprise an indicator indicating whether the item was successfully processed at the electronic check processing point. In addition, the record can comprise detailed information related to the item and/or the electronic check processing point, such as a date and/or time at which the item was processed at the electronic check processing point and a reason for any processing failure incurred during the electronic check processing point.

The tracking module can store each record in an electronic cash letter record file. The tracking module can associate each record corresponding to a particular item to the item in the electronic cash letter record file. For example, the tracking module can associate a common sequence number to the item and to each of the records corresponding to the item. The sequence number can be any indicia that can be used to identify the item. For example, the sequence number can include any set of numbers, letters, and/or symbols that identify the particular item.

Similarly, the tracking module can associate each record corresponding to a particular item to the ICL and/or electronic ICL file in which the item was received at the check processor. For example, the tracking module can associate a common tracking number to the item, the ICL, and/or the electronic ICL file in the electronic cash letter record file. The tracking number can comprise any indicia that can be used to identify the item, the ICL, and/or the electronic ICL file. For example, the tracking number can include any set of numbers, letters, and/or symbol that identify the particular item, ICL, and/or electronic ICL file.

The tracking module can use the records to monitor the processing status of each ICL and item. The tracking module can read the records to determine whether each ICL and item processed correctly, and if not, at which processing point it failed. It can further determine whether the item was processed multiple times. For example, if the tracking module identifies a record indicating that the item failed to complete a particular processing event, then the tracking module can determine that the item has failed to process. Alternatively, if the tracking module identifies a record indicating that the item was successfully presented to a receiving institution for payment, then the tracking module can determine that the item has been processed. If the tracking module identifies multiple such records corresponding to the item, then the tracking module can determine that the item has been processed multiple times.

In one aspect of the invention, the tracking module can present the processing status of an ICL/item in response to a query to obtain the status of the ICL/item. For example, the tracking module can display the processing status on a monitor or it can present the status in a printed, paper report.

These and other aspects, objects, features, and advantages of the invention will become apparent to those skilled in the art upon consideration of the following detailed description of exemplary embodiments, which include the best mode of carrying out the invention as presently perceived.

DETAILED DESCRIPTION OF EXEMPLARY EMBODIMENTS

The invention is directed to systems and methods for processing checks under the Check Clearing For The $21^{st}$ Century Act ("the Act"). In particular, the invention is directed to monitoring the processing status of electronic image cash letters ("ICLs") and items in the ICLs ("items" or "ICL items") during electronic check processing and determining whether each item in a particular ICL has been presented to a receiving institution.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
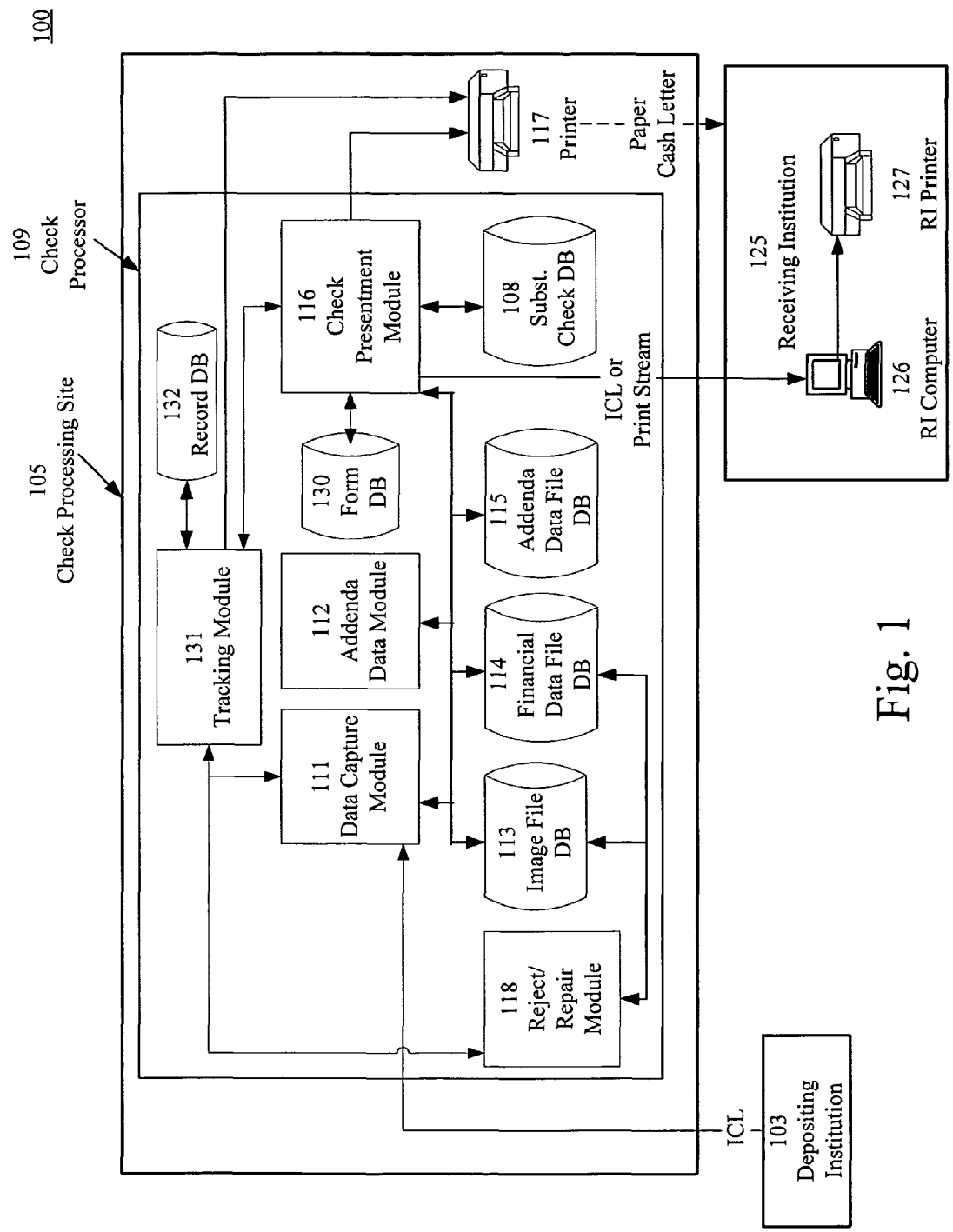
FIG. 1 is a block diagram depicting a system for processing checks, according to an exemplary embodiment.
Figure 2:
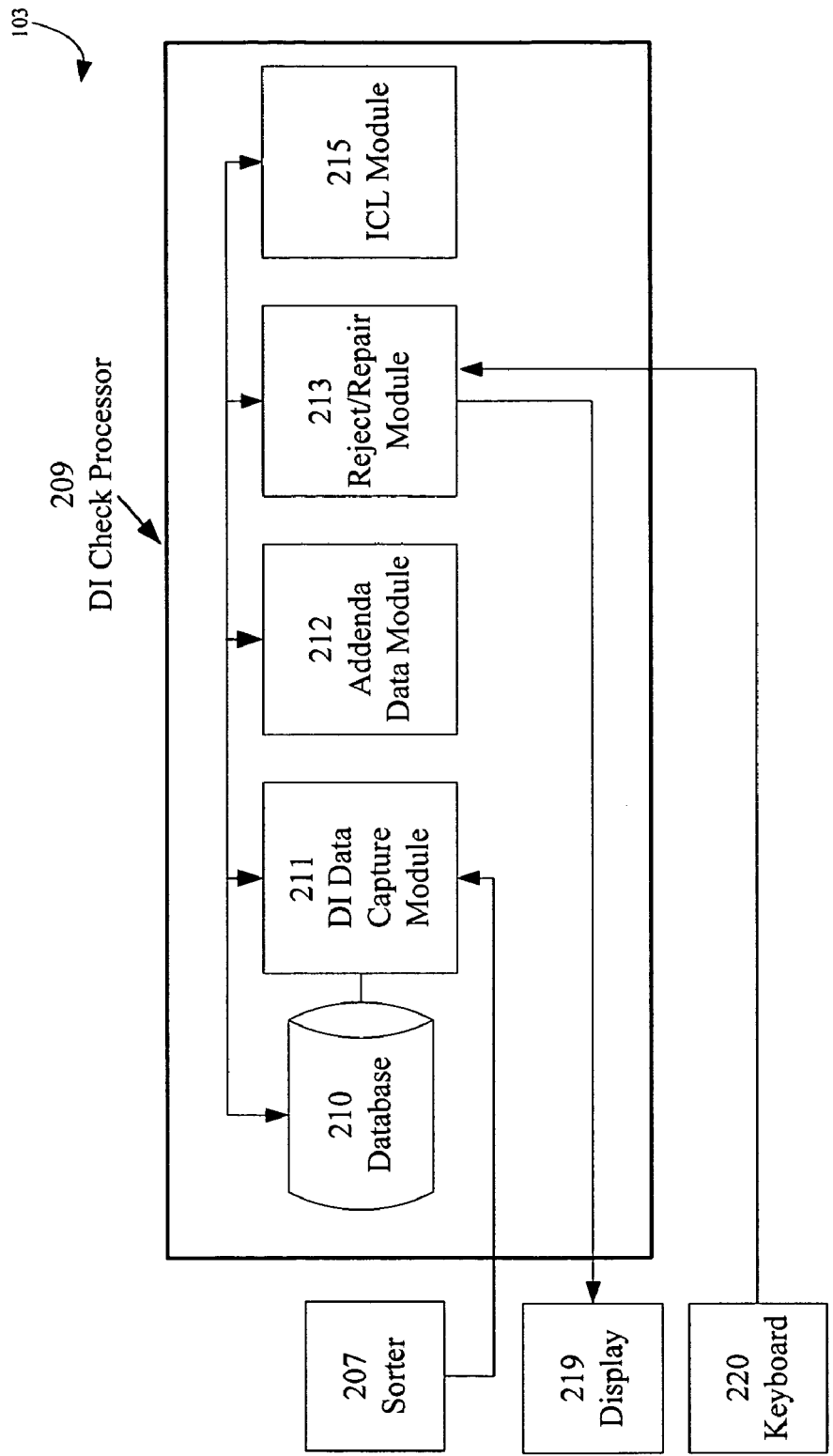
FIG. 2 is a block diagram depicting a depositing institution of a system for processing checks, according to an exemplary embodiment.

An exemplary system for processing checks will now be described with reference to FIGS. 1-2. FIG. 1 is a block diagram depicting a system 100 for processing checks, according to an exemplary embodiment. FIG. 2 is a block diagram depicting a depositing institution 103 of the system 100, according to an exemplary embodiment.

The system 100 comprises various financial institutions and computer systems involved in check processing. In particular, the system 100 comprises the depositing institution 103, a check processing site 105, and a receiving institution 125. The depositing institution 103 collects paper checks from a customer. Then, the depositing institution 103 can bundle the paper checks in one or more paper cash letters. Each paper cash letter can comprise one or more bundles of original paper checks and paper image replacement documents, such as substitute checks. The depositing institution 103 forwards the paper checks to the check processing site 105 via a paper cash letter for electronic processing.

Alternatively, the depositing institution 103 can itself generate an electronic image cash letter based on the paper checks. In this case, the depositing institution 103 can forward the generated ICL to the check processing site 105 for electronic processing. The ICL can be an electronic file that complies with the American National Standards Institute Specifications for Electronic Exchange of Check and Image Data (ANSI X9.37/X9.100), or other appropriate industry standards, as may change from time to time. The ICL can comprise, for each paper check, one or more electronic images of the check, all of the complete MICR data provided on the check, and additional financial data related to the check.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise a ICL control record comprising information about the origin and destination of the ICL, and a cash letter bundle summary control record comprising a summary of all bundle summary control records in the ICL.

Thus, in alternative embodiments of the invention, the depositing institution 103 can (1) forward received paper checks to the check processing site 105; or (2) generate an ICL for received checks and forward the ICL to the check processing site 105.

The following description discusses an exemplary embodiment in which the depositing institution 103 generates an ICL for received checks and forwards the ICL to the check processing site 105. The depositing institution 103 processes the received paper checks at a sorter 207. The sorter 207 electronically captures information from each paper check. The sorter 207 comprises an image capture device (not shown), such as a scanner or camera, which captures at least one electronic image of each check. For example, the sorter 207 can capture, for each check, an image of the front of the check and an image of the back of the check.

Upon image capture, the sorter 207 forwards each image to a DI data capture module 211 of a DI check processor 209 for further processing. The DI data capture module 211 can store the electronic image(s) in one or more image files, which the DI data capture module 211 maintains in a database 210 of the DI check processor 209. In one exemplary embodiment, the sorter 207 and the DI data capture module 211 can be part of the same physical unit.

The sorter 207 further comprises a MICR reader (not shown) that reads the MICR data financial data from each check. Upon reading the MICR data, the sorter 207 identifies additional financial data related to the check, which is incidental to the processing of the check, and associates that information with the check image(s). For example, the sorter 207 can identify or assign a unique item sequence number, a check processing site identifier, a processing date, a check amount, and/or a routing transit number of the depositing institution 103. The sorter 207 forwards the financial data, including the MICR data and additional financial data, to the DI data capture module 211 for further processing.

The DI data capture module 211 stores a form financial data file with multiple fields. For example, the DI data capture module 211 can store the form financial data file with exemplary field labels F1-F7 and F10-F12. The DI data capture module 211 reads the financial data from the sorter 207 and parses and stores portions of the financial data in each of the data fields. For example, the DI data capture module 211 can store truncated financial data in fields F1-F7 of the financial data file. The DI data capture module 211 can further store untruncated financial data in fields F10-F11 of the financial data file. The fields of the financial data file can comprise all of the MICR data from the original paper check. The DI data capture module 211 stores the financial data file in the database 210.

The DI check processor 209 further comprises an addenda data module 212, which generates and/or captures electronic addenda data for each check. For example, the addenda data can comprise a bank endorsement. The addenda data module 212 inputs the addenda data into one or more addenda data files. The addenda data module 212 stores the addenda data file(s) in the database 210.

For each check, the DI data capture module 211 associates the corresponding image file(s), financial data file, and addenda data file(s) for a check with a sequence number, identification number, or other suitable data link that uniquely identifies the check data.

The DI check processor 209 further comprises a reject/repair module 213, which can verify, for each check, the contents of the image file(s) and the financial data file. The reject/repair module 213 analyzes the financial data file for errors. For example, the reject/repair module 213 can detect an error if a field of the financial data file is empty or if it comprises a character or string that is not in the proper format. If an error is detected, the reject/repair module 213 presents the image file(s) and certain of the associated financial data from the financial data file on a display 219 for viewing by a user. The presented financial data can comprise the complete MICR data from the original paper check. In an exemplary embodiment, the display 219 can be a computer monitor or another device suitable for presenting images and textual data to the user.

The user compares the presented financial data with the presented image file(s) and corrects any errors in the financial data via a keyboard 220 or other suitable input device. For example, where a displayed data field is empty or incorrect but the displayed image of the check comprises data corresponding to the data field, the user can enter the financial data from the displayed image into the displayed data field. Then, the reject/repair module 213 stores the complete, corrected financial data in the financial data file.

The functionality of the reject/repair module 213 is described in more detail in U.S. patent application Ser. No. 11/362,343, entitled "Expanded Mass Data Sets for Electronic Check Processing," filed on Feb. 22, 2006.

The DI check processor 209 further comprises an ICL module 215, which generates at least one ICL comprising information regarding one or more bundles of checks. Each bundle can comprise one or more checks. For each check, the ICL can include the electronic image(s) from the check's image file(s), the financial data from the check's financial data file, and the addenda data from the check's addenda data file.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise a ICL control record comprising information about the origin and destination of the ICL, and a cash letter bundle summary control record comprising a summary of all bundle summary control records in the ICL. The DI check processor 209 forwards the ICL to a data capture module 111 of a check processor 109 of the check processing site 105 for further processing. The DI check processor 209 can forward the ICL to the data capture module 111 of the check processing site 105 via an electronic ICL file. The electronic ICL file can comprise one or more ICLs.

Upon receiving the electronic ICL file, the data capture module 111 instructs a tracking module 131 of the check processor 109 to create an electronic cash letter record file for use in monitoring the processing status of each ICL and item contained in the electronic ICL file. The electronic cash letter record file comprises data fields configured to receive information regarding the electronic ICL file and each ICL and item contained therein. For example, the electronic cash letter record file can comprise a field in which the current processing status of an ICL/item can be stored. The tracking module 131 stores the electronic cash letter record file in a record database 132 of the check processor 109.

The tracking module 131 stores a record of receiving the electronic ICL file in the electronic cash letter record file. For example, the record can identify the electronic ICL file and associate a receipt indicator with the electronic ICL file. The record can identify the electronic ICL file by any identifying means, such as a total dollar amount of the ICLs contained within the electronic ICL file or the name and/or American Bankers Association ("ABA") routing number of the depositing institution 103 that transmitted the electronic ICL file to the data capture module 111. The receipt indicator can comprise any indicia indicating that the electronic ICL file was received by the data capture module 111. For example, the receipt indicator can comprise a simple, binary indicator. Alternatively, the receipt indicator can comprise the date and/or time at which the electronic ICL file was received by the data capture module 111.

Upon storing the record of receiving the electronic ICL file in the electronic cash letter record file, the tracking module 131 validates the contents and/or format of the electronic ICL file. For example, the tracking module 131 can determine whether each ICL in the electronic ICL file complies with the American National Standards Institute Specifications for Electronic Exchange of Check and Image Data (ANSI X9.37/X9.100), or other appropriate industry standards, as may change from time to time. The tracking module 131 also can evaluate each electronic check image in the ICLs to determine whether it meets particular quality standards. Certain exemplary systems and methods for performing such an evaluation are described in co-pending U.S. patent application Ser. No. 11/079,120, entitled "Assessing Electronic Image Quality," the disclosure of which is hereby fully incorporated herein by reference.

For example, the tracking module 131 can determine whether to accept or reject the electronic ICL file for processing based on the validation results. Similarly, the tracking module 131 can determine whether to accept or reject each ICL and/or item contained in the electronic ICL file based on the validation results. The tracking module 131 stores a record of the validation in the electronic cash letter record file. For example, the record of the validation can comprise a simple, binary indicator indicating that the validation was completed or failed to complete. Alternatively, the record of the validation can comprise detailed information regarding the validation completion and/or the results of the validation. For example, the record of the validation can comprise the date and/or time at which the validation was started, completed, and/or failed, the reason(s) that the validation failed, the results of the validation, and a reason for each validation result.

Upon validating the electronic ICL file, the check processor 109 separately processes each ICL and item contained in the electronic ICL file. For each ICL in the electronic ICL file, the tracking module 131 assigns a tracking number to the ICL and each of the items contained therein. In an exemplary embodiment, the same tracking number can be assigned to the ICL and each item in the ICL. In an alternative exemplary embodiment, different tracking numbers can be assigned to the ICL and each item in the ICL, with the tracking number for each item also identifying the ICL. The tracking number can be any unique indicia that can be used to identify the ICL and the items. For example, the tracking number can comprise any set of numbers, letters, symbols, or a combination thereof. The tracking module 131 can use the tracking number in monitoring the processing status of the ICL and the items. For example, the tracking module 131 can use the tracking number to identify certain records in the electronic cash letter record file regarding the processing status of the ICL and the items.

The tracking module 131 stores the tracking number in the electronic cash letter record file. For example, for each ICL, the tracking module 131 can store a record identifying the ICL and associating the tracking number with the ICL and the items contained therein. In one exemplary embodiment, the record can comprise a list of the items in the ICL. The record can identify, or otherwise be associated with, the electronic ICL file from which the ICL originated.

The tracking module 131 can further associate an incoming ICL value amount and an outgoing ICL value amount with each ICL. The incoming ICL value amount comprises the total value of the items in the received ICL. The outgoing ICL value amount comprises the total value of the items in the received ICL that have been presented in an outgoing ICL. Because none of the items in the received ICL will have been presented to a receiving institution 125 at the time the tracking module 131 first associates the value amounts with the ICL, the initial value of the outgoing ICL value amount is $0. As each item from the received ICL is presented to a receiving institution 125, the tracking module 131 can update the outgoing ICL value amount. Upon successful presentment of each item in the ICL, the outgoing ICL value amount should equal the incoming ICL value amount. The tracking module 131 can store the incoming ICL value amount and the outgoing ICL value amount in the electronic cash letter record file. Each value amount can be associated with the ICL and/or the ICL's tracking number in the electronic cash letter record file.

The tracking module 131 assigns a sequence number to each item in each ICL. For each item, the sequence number can comprise any unique indicia that can be used to identify the item. For example, the sequence number can comprise any set of numbers, letters, symbols, or a combination thereof. The tracking module 131 can store the sequence number in the electronic cash letter record file. For example, the tracking module 131 can store a record identifying the item and associating the sequence number with the item. The record can identify, or otherwise be associated with, the ICL, and/or the electronic ICL file, from which the item originated.

The tracking module 131 can use an item's sequence number in monitoring the processing status of the item. For example, the tracking module 131 can use the sequence number to identify certain records in the electronic cash letter record file related to the processing status of the item.

For each item in each ICL, the data capture module 111 reads the contents of the item and/or the contents of the ICL corresponding to the item and stores any electronic check image(s) corresponding to the item in one or more image files. The data capture module 111 maintains the image file(s) in an image file database 113 of the check processor 109. The tracking module 131 stores a record of the image file storage in the electronic cash letter record file. For example, the record of the image file storage can comprise a simple, binary indicator indicating that the image file storage was completed or failed to complete. Alternatively, the record of the image file storage can comprise detailed information regarding the image file storage, such as the date and/or time at which the image file storage occurred, the date and/or time at which the image file storage failed, the reason(s) for which the image file storage failed, and the name(s) of the stored image file(s).

For each item in each ICL, the data capture module 111 reads the contents of the item and/or the contents of the ICL corresponding to the item and stores financial data corresponding to the item in a financial data file. The data capture module 111 maintains the financial data file in a financial data file database 114 of the check processor 109. The tracking module 131 stores a record of the financial data file storage in the electronic cash letter record file in the record database 132. For example, the record of the financial data file storage can comprise a simple, binary indicator indicating that the financial data file storage was completed or failed to complete. Alternatively, the record of the financial data file storage can comprise detailed information regarding the financial data file storage, such as the date and/or time at which the financial data file storage occurred, the date and/or time at which the financial data file storage failed, the reason(s) for which the financial data file storage failed, and the name of the stored financial data file.

For each item in each ICL, an addenda data module 112 reads the contents of the item and/or the contents of the ICL corresponding to the item and stores addenda data corresponding to the item in one or more addenda data files. The addenda data module 112 maintains the addenda data file(s) in an addenda data file database 115 of the check processor 109. The tracking module 131 stores a record of the addenda data file storage in the electronic cash letter record file. For example, the record of the addenda data file storage can comprise a simple, binary indicator indicating that the addenda data file storage was completed or failed to complete. Alternatively, the record of the addenda data file storage can comprise detailed information regarding the addenda data file storage, such as the date and/or time at which the addenda data file storage occurred, the date and/or time at which the addenda data file storage failed, the reason(s) for which the addenda data file storage failed, and the name(s) of the stored addenda data file(s).

For each item in each ICL, the data capture module 111 associates the corresponding image file(s), financial data file, and addenda data file(s) for further processing. For example, the data capture module 111 can associate the image file(s), the financial data file, and the addenda data file(s) for the item with the item's sequence number or another suitable data link.

Upon associating the image file(s), financial data file, and addenda data file(s) for a particular item, a reject/repair module 118 of the check processor 109 performs a reject/repair analysis of the item's financial data file. The reject/repair module 118 analyzes the financial data file for errors and helps a user to correct any detected errors using the electronic check image(s) corresponding to the item. For example, the reject/repair module 118 can detect an error if a field of the financial data file is empty or if it comprises a character or string that is not in the proper format. The functionality of the reject/repair module 118 is described in more detail in U.S. patent application Ser. No. 11/362,343, entitled "Expanded Mass Data Sets for Electronic Check Processing," filed on Feb. 22, 2006.

The tracking module 131 stores a record of the reject/repair analysis in the electronic cash letter record file. For example, the record of the reject/repair analysis can comprise a simple, binary indicator indicating that the reject/repair analysis was completed or failed to complete. Alternatively, the record of the reject/repair analysis can comprise detailed information regarding the reject/repair analysis completion and/or the results of the reject/repair analysis. For example, the record of the reject/repair analysis can comprise the date and/or time at which the reject/repair analysis was started and/or completed, the date and/or time at which the reject/repair analysis failed to complete, the reason(s) for which the reject/repair analysis failed to complete, the results of the reject/repair analysis, and a list of errors addressed during the reject/repair analysis. The tracking module 131 associates the record with the item in the electronic cash letter record file.

The check processor 109 further comprises a check presentment module 116, which is operable to present each received item to the receiving institution 125 for payment. The check presentment module 116 can generate a substitute check file for each item. In an exemplary embodiment, the substitute check file can comprise the electronic image(s), financial data, and addenda data corresponding to the item. The check presentment module 116 stores the substitute check file in a substitute check database 108 of the check processor 109.

The tracking module 131 stores a record of the substitute check file storage in the electronic cash letter record file. For example, the record of the substitute check file storage can comprise a simple, binary indicator indicating that the substitute check file storage was completed or failed to complete. Alternatively, the record of the substitute check file storage can comprise detailed information regarding the substitute check file storage, such as the date and/or time at which the substitute check file was created, the date and/or time at which the substitute check file storage occurred, the date and/or time at which the substitute check file creation/storage failed, the reason(s) for which the substitute check file creation/storage failed, and the name of the stored substitute check file. The tracking module 131 associates the record with the item in the electronic cash letter record file.

For each receiving institution 125, the check presentment module 116 creates at least one ICL comprising one or more substitute check files. The tracking module 131 stores a record of the ICL creation in the electronic cash letter record file. For example, the record of the ICL creation can comprise a simple, binary indicator indicating that the ICL was created or that the check presentment module 116 failed to create the ICL. Alternatively, the record of the ICL creation can comprise detailed information regarding the ICL creation, such as the date and/or time at which the ICL was created, the date and/or time at which the check presentment module 116 failed to create the ICL, and the reason(s) for which the check presentment module 116 failed to create the ICL. The tracking module 131 associates the record with each item included in the created ICL in the electronic cash letter record file.

The tracking module 131 aggregates the values of the items in the created ICL by tracking number. For each tracking number, the tracking module 131 adds the aggregated value to the outgoing ICL value amount corresponding to the tracking number. Thus, the outgoing ICL value amount will comprise the total value of the items received in the ICL associated with the tracking number that have been processed for presentment in the created, outgoing ICL. For example, the tracking module 131 can determine whether all the items in the ICL processed correctly based or whether the outgoing ICL value amount equals the incoming ICL value amount. If so, then all of the items processed correctly. If not, then at least one of the items has not finished processing or has not been processed correctly.

Depending on the preferences of the receiving institution 125, the check presentment module 116 can present the ICL electronically or via paper. For example, the check presentment module 116 can electronically transmit the ICL via a network (not illustrated) to an RI computer 126 of the receiving institution 125. Upon transmitting the ICL, the tracking module 131 stores a record of the ICL transmission in the electronic cash letter record file. For example, the record of the ICL transmission can comprise a simple, binary indicator indicating that the ICL was transmitted or that the check presentment module 116 failed to transmit the ICL. Alternatively, the record of the ICL transmission can comprise detailed information regarding the ICL transmission, such as the date and/or time at which the ICL was transmitted, the date and/or time at which the ICL failed to transmit, the reason(s) for which the ICL failed to transmit, and the name and/or ABA number of the receiving institution 125. The tracking module 131 associates the record with each item included in the transmitted ICL in the corresponding electronic cash letter record file.

Alternatively, the ICL can be locally or remotely printed for paper delivery. For example, the check presentment module 116 can locally print the ICL on a printer 117 of the check processing site 105. In an exemplary embodiment, the check presentment module 116 can prepare a print stream comprising the ICL. Certain exemplary systems and methods for generating such a print stream are described in co-pending U.S. patent application Ser. No. 11/362,344, entitled "Cash Letter Print Streams with Audit Data," filed on Feb. 22, 2006, the disclosure of which is hereby fully incorporated herein by reference.

Upon generation of the print stream, the tracking module 131 stores a record of the print stream generation in the electronic cash letter record file. For example, the record of the print stream generation can comprise a simple, binary indicator indicating that the print stream was generated or that the check presentment module 116 failed to generate the print stream. Alternatively, the record of the print stream generation can comprise detailed information regarding the print stream generation, such as the date and/or time at which the print steam was generated, the date and/or time at which the check presentment module 116 failed to generate the print stream, and the reason(s) for which the check presentment module 116 failed to generate the print stream. The tracking module 131 associates the record with each item included in the ICL of the print stream in the corresponding electronic cash letter record file.

The check presentment module 116 can transmit the generated print stream to the printer 117 for printing. The tracking module 131 stores a record of the printing in the electronic cash letter record file. For example, the record of the printing can comprise a simple, binary indicator indicating that the ICL was printed or that the ICL failed to print. Alternatively, the record of the substitute check file storage can comprise detailed information regarding the ICL printing, such as the date and/or time at which the printing was started, the date and/or time at which the printing completed, the date and/or time at which the printing failed, the reason(s) for which the printing failed, and the location of the printer 117. The tracking module 131 associates the record with each item included in the printed ICL in the electronic cash letter record file. An operator at the check processing site 105 can collect one or more of the printed ICLs for delivery to the receiving institution 125.

Alternatively, the check presentment module 116 can generate, and transmit to the receiving institution 125, a print stream by which the receiving institution 125 can print the ICL on an RI Printer 127. Upon transmission of the print stream, the tracking module 131 stores a record of the print stream transmission in the electronic cash letter record file. For example, the record of the print stream transmission can comprise a simple, binary indicator indicating that the print stream was transmitted or that the check presentment module 116 failed to transmit the print stream. Alternatively, the record of the print stream transmission can comprise detailed information regarding the print stream transmission, such as the date and/or time at which the print steam was transmitted, the date and/or time that the print stream transmission failed, the reason(s) for which the print stream transmission failed, the location of the RI Printer 127, and the name, location, and/or ABA number of the receiving institution 125. The tracking module 131 associates the record with each item included in the ICL of the print stream in the corresponding electronic cash letter record file.

In an alternative exemplary embodiment, the check presentment module 116 can generate an ICL print stream without first generating an ICL or a substitute check file. The check presentment module 116 can collect data directly from the image file database 113, the financial data file database 114, and/or the addenda data file database 115 for creation of the print stream. The check presentment module 116 can store the collected data in pre-defined fields of a print stream file and transmit the print stream file to the printer 117 or the RI printer 127 for printing. Upon generating the ICL print stream and/or transmitting the ICL print stream, the tracking module 131 can create and store appropriate records in the electronic cash letter record file, as described above.

The functionality of the check presentment module 116 is described in more detail below with reference to FIGS. 4A and 4B.

In an alternative exemplary embodiment, the tracking module 131 can maintain a single record for each ICL and/or each item in the electronic cash letter record file. The tracking module 131 can continuously update the single record to reflect the current processing status of the ICL/item. Thus, the current processing status of the ICL/item can be determined simply by reading the record in the electronic cash letter record file.

The tracking module 131 can monitor the processing status of each ICL and each item throughout the various stages of electronic check processing. It can read the records stored in the electronic cash letter record file to determine whether each ICL and item processed correctly, and if not, at which processing point it failed. In addition, it can balance each incoming ICL by determining whether each item in the incoming ICL has been presented in a corresponding, outgoing ICL.

For example, for a particular ICL, the tracking module 131 can read the incoming ICL value amount and the outgoing ICL value amount associated with the ICL in the electronic cash letter record file. If the amounts are equal, then all items in the ICL have been processed. If the amounts are not equal, then one or more of the items in the ICL have not been processed, have failed to process, or have been processed multiple times.

The tracking module 131 can determine the processing status of each item in the ICL by reviewing the electronic cash letter record file. For example, if no record corresponding to a particular item in the electronic cash letter record file indicates that a substitute check file corresponding to the item was included in an outgoing ICL file, then the tracking module 131 can determine that the item has not yet been fully processed. In addition, if multiple records corresponding to a particular item indicate that a substitute check file corresponding to the item was included in an outgoing ICL file, then the tracking module 131 can determine that the item has been processed multiple times.

In one exemplary embodiment, the tracking module 131 can generate one or more reports regarding the processing statuses of the ICLs/items. For example, the tracking module 131 can generate a report comprising the processing status of each item in an ICL. Alternatively, the tracking module 131 can generate a report comprising the processing status of each item that has failed to process, remains pending, or has been processed multiple times. For example, the report can comprise a list of each item that has failed to process, remains pending, or has been processed multiple times. The report can further comprise detailed information regarding the processing status of each item, such as the last processing step that the item completed, the date and/or time that the item completed its last processing step, the date and/or time that the item failed to complete a processing step, the reason(s) for which the item failed to complete a processing step, the date and/or time that the item was received (in the electronic ICL file) at the check processor 109, and/or the dollar value of the item.

In one exemplary embodiment, the report can comprise a summary of the processing statuses of all the items in an ICL. For example, the report can comprise a total number of items in the ICL, a total number of items in the ICL that have been processed, a total number of items in the ICL that have failed to process, a total number of items in the ICL that remain pending, and/or a total number of items in the ICL that have been processed multiple times.

The tracking module 131 can output each generated report. For example, the tracking module 131 can display a generated report on a monitor (not shown) or other display device. Alternatively, the tracking module 131 can print the generated report on the printer 117 of the check processing site.

The functionality of the tracking module 131 is described in more detail below with reference to FIGS. 5 and 6.

Those skilled in the art will appreciate that exemplary system 100 is merely representative of the components for processing checks. Other embodiments of the invention may not have all of the components identified in FIGS. 1-2 or can include additional components.

Figure 3A:
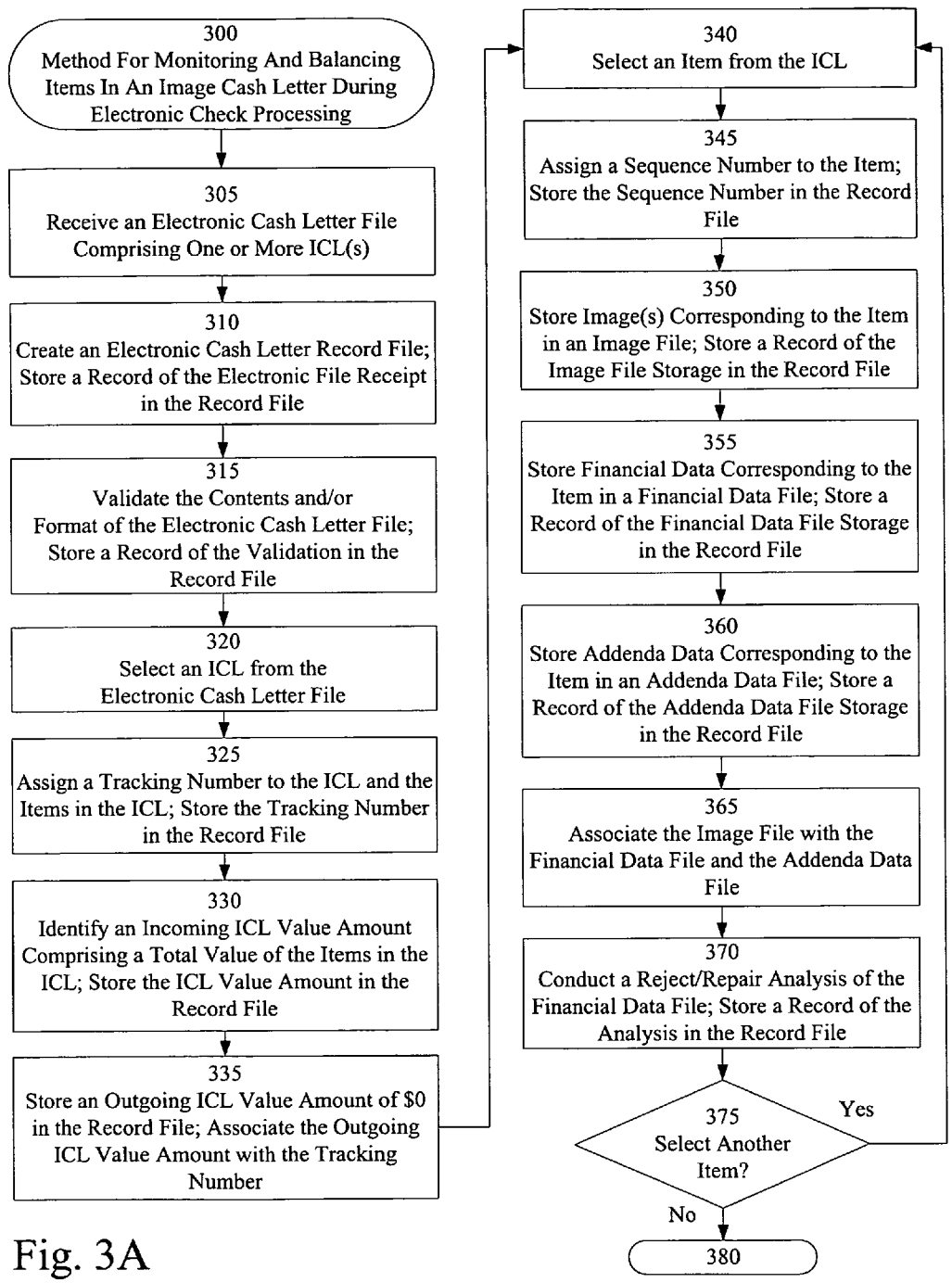
FIGS. 3A and 3B are flow charts depicting a method for monitoring and balancing items in an image cash letter during electronic check processing, according to an exemplary embodiment.
Figure 3B:
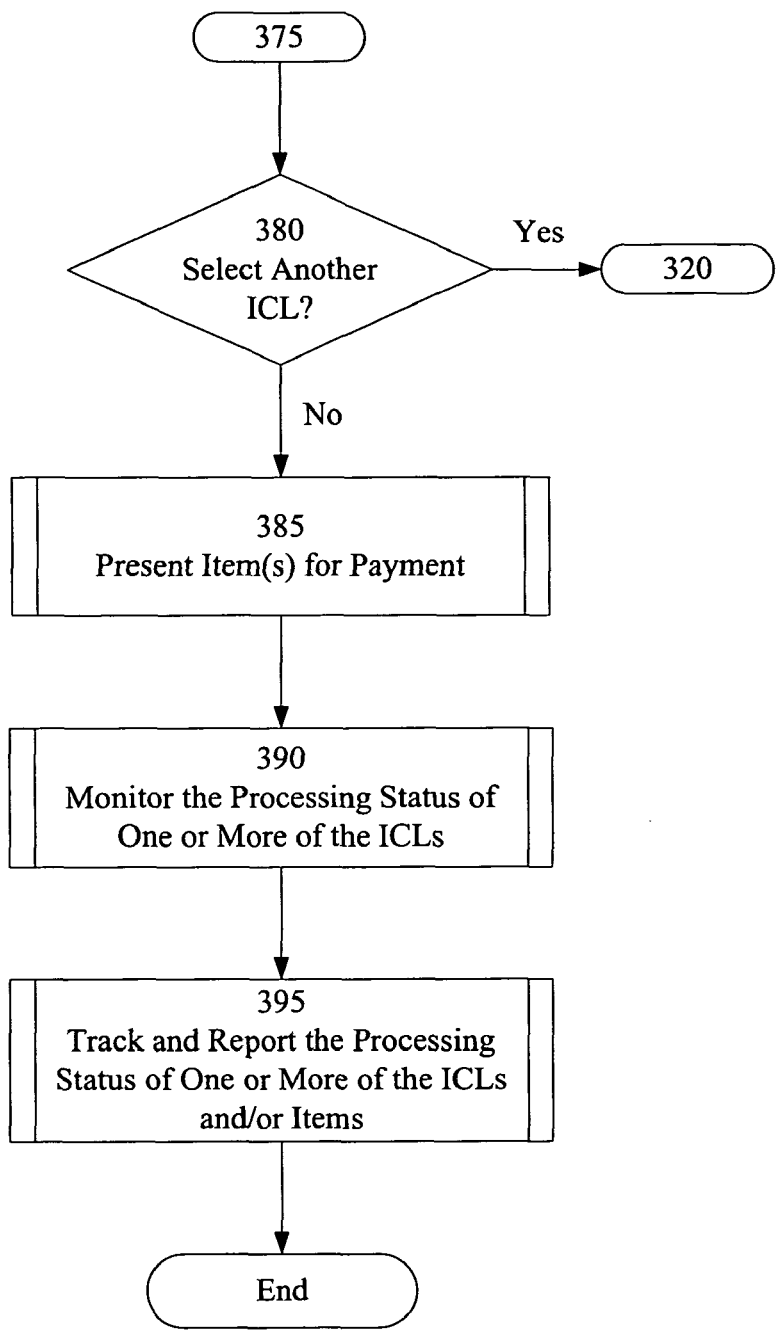

FIGS. 3A and 3B are flow charts depicting a method 300 for monitoring and balancing items in an image cash letter during electronic check processing, according to an exemplary embodiment. The exemplary method 300 is merely illustrative and, in alternative embodiments of the invention, certain steps can be performed in a different order, performed in parallel with one another, or omitted entirely, and/or certain additional steps can be performed without departing from the scope and spirit of the invention. The method 300 is described below with reference to FIGS. 1 and 3.

In step 305, the data capture module 111 receives an electronic cash letter file comprising one or more ICLs. The data capture module 111 instructs the tracking module 131 to create an electronic cash letter record file for use in monitoring the processing progress of each ICL and item contained in the electronic ICL file. The tracking module 131 creates the electronic cash letter record file and stores a record of the electronic ICL file receipt in step 310.

For example, the record of the electronic ICL file receipt can identify the electronic ICL file and associate a receipt indicator with the electronic ICL file. The record can identify the electronic ICL file by any identifying means, such as a total dollar amount of the ICLs contained within the electronic ICL file or the name and/or ABA number of the depositing institution 103 that transmitted the electronic ICL file to the data capture module 111. The receipt indicator can comprise any indicia indicating that the electronic ICL file was received by the data capture module 111. For example, the receipt indicator can comprise a simple, binary indicator. Alternatively, the receipt indicator can comprise the date and/or time at which the electronic ICL file was received by the data capture module 111. The tracking module 131 can store the electronic cash letter record file in the record database 132.

In step 315, the tracking module 131 validates the contents and/or format of the electronic ICL file and stores a record of the validation in the electronic cash letter record file. For example, the tracking module 131 can determine whether each ICL in the electronic ICL file complies with the American National Standards Institute Specifications for Electronic Exchange of Check and Image Data (ANSI X9.37/X9.100), or other appropriate industry standards, as may change from time to time. The tracking module 131 also can evaluate each electronic check image in the ICLs to determine whether it meets particular quality standards. Certain exemplary systems and methods for performing such an evaluation are described in co-pending U.S. patent application Ser. No. 11/079,120, entitled "Assessing Electronic Image Quality," the disclosure of which is hereby fully incorporated herein by reference.

For example, the tracking module 131 can determine whether to accept or reject the electronic ICL file for processing based on the validation results. Similarly, the tracking module 131 can determine whether to accept or reject each ICL and/or item contained in the electronic ICL file based on the validation results.

For example, the record of the validation can comprise a simple, binary indicator indicating that the validation was completed. Alternatively, the record of the validation can comprise detailed information regarding the validation completion and/or the results of the validation. For example, the record of the validation can comprise the date and/or time at which the validation was started, completed, and/or failed, the reason(s) that the validation failed, the results of the validation, and a reason for each validation result.

In step 320, the tracking module 131 selects an ICL from the electronic cash letter file for processing. The tracking module 131 assigns a tracking number to the selected ICL and the items in the selected ICL in step 325. The tracking number can be any unique indicia that can be used to identify the ICL and items. For example, the tracking number can comprise any set of numbers, letters, symbols, or a combination thereof. The tracking module 131 can use the tracking number to track the processing status of the ICL and the items contained therein.

The tracking module 131 stores the tracking number in the electronic cash letter record file. For example, for each ICL, the tracking module 131 can store a record identifying the ICL and associating the tracking number with the ICL and the items contained therein. In one exemplary embodiment, the record can comprise a list of the items in the ICL. The record can identify, or otherwise be associated with, the electronic ICL file from which the ICL originated.

In step 330, the tracking module 131 identifies an incoming ICL value amount comprising a total value of the items in the selected ICL and stores the incoming ICL value amount in the electronic cash letter record file. The tracking module 131 can associate the incoming ICL value amount with the ICL and/or the ICL's tracking number in the electronic cash letter record file.

In an alternative exemplary embodiment of step 330, the tracking module 131 can identify an incoming ICL item count comprising a total number of the items in the selected ICL and can store the incoming ICL item count in the electronic cash letter record file. The tracking module 131 can associate the incoming ICL item count with the ICL and/or the ICL's tracking number in the electronic cash letter record file.

In step 335, the tracking module 131 stores an outgoing ICL value amount of $0 in the electronic cash letter record file and associates the outgoing ICL value amount with the ICL and/or the ICL's tracking number in the electronic cash letter record file. The outgoing ICL value amount comprises the total value of the items in the ICL that have been presented in an outgoing ICL. Because none of the items in the ICL will have been presented to a receiving institution at the time the tracking module 131 first associates the outgoing ICL value amount with the ICL, the initial value of the outgoing ICL value amount is $0. As set forth below, as each item is presented to a receiving institution 125, the tracking module 131 can update the outgoing ICL value amount. Upon successful presentment of each item from the ICL, the outgoing ICL value amount should equal the incoming ICL value amount.

In step 340, the tracking module 131 selects an item from the ICL. The tracking module 131 assigns a sequence number to the selected item in step 345. The sequence number can be any unique indicia that can be used to identify the item. For example, the sequence number can comprise any set of numbers, letters, symbols, or a combination thereof. The tracking module 131 stores the sequence number in the electronic cash letter record file. For example, the tracking module 131 can store a record identifying the item and associating the sequence number with the item. The record can identify, or otherwise be associated with, the ICL, and/or the electronic ICL file, from which the item originated.

The tracking module 131 can use the item's sequence number in monitoring the processing status of the item. For example, the tracking module 131 can use the sequence number to identify certain records in the electronic cash letter record file regarding the processing status of the item.

In step 350, the data capture module 111 reads the contents of the item and/or the contents of the ICL corresponding to the item and stores any electronic check image(s) corresponding to the item in one or more image files. The data capture module 111 maintains the image file(s) in an image file database 113 of the check processor 109. The tracking module 131 stores a record of the image file storage in the electronic cash letter record file. For example, the record of the image file storage can comprise a simple, binary indicator indicating that the image file storage was completed or failed to complete. Alternatively, the record of the image file storage can comprise detailed information regarding the image file storage, such as the date and/or time at which the image file storage occurred, the date and/or time at which the image file storage failed, the reason(s) for which the image file storage failed, and the name(s) of the stored image file(s).

In step 355, the data capture module 111 reads the contents of the item and/or the contents of the ICL corresponding to the item and stores financial data corresponding to the item in a financial data file. The data capture module 111 maintains the financial data file in a financial data file database 114 of the check processor 109. The tracking module 131 stores a record of the financial data file storage in the electronic cash letter record file. For example, the record of the financial data file storage can comprise a simple, binary indicator indicating that the financial data file storage was completed or failed to complete. Alternatively, the record of the financial data file storage can comprise detailed information regarding the financial data file storage, such as the date and/or time at which the financial data file storage occurred, the date and/or time at which the financial data file storage failed, the reason(s) for which the financial data file storage failed, and the name of the stored financial data file.

In step 360, the addenda data module 112 reads the contents of the item and/or the contents of the ICL corresponding to the item and stores addenda data corresponding to the item in one or more addenda data files. The addenda data module 112 maintains the addenda data file(s) in the addenda data file database 115 of the check processor 109. The tracking module 131 stores a record of the addenda data file storage in the electronic cash letter record file. For example, the record of the addenda data file storage can comprise a simple, binary indicator indicating that the addenda data file storage was completed or failed to complete. Alternatively, the record of the addenda data file storage can comprise detailed information regarding the addenda data file storage, such as the date and/or time at which the addenda data file storage occurred, the date and/or time at which the addenda data file storage failed, the reason(s) for which the addenda data file storage failed, and the name(s) of the stored addenda data file(s).

In step 365, the data capture module 111 associates the image file(s), financial data file, and addenda data file(s) stored in steps 350-360 for further processing. For example, the data capture module 111 can associate the image file(s), the financial data file, and the addenda data file(s) for the item with the item's sequence number or another suitable data link.

In step 370, the reject/repair module 118 performs a reject/repair analysis of the item's financial data file. The reject/repair module 118 analyzes the financial data file for errors and helps a user to correct any detected errors using the electronic check image(s) corresponding to the item. For example, the reject/repair module 118 can detect an error if a field of the financial data file is empty or if it comprises a character or string that is not in the proper format. The functionality of the reject/repair module 118 is described in more detail in U.S. patent application Ser. No. 11/362,343, entitled "Expanded Mass Data Sets for Electronic Check Processing," filed on Feb. 22, 2006.

The tracking module 131 stores a record of the reject/repair analysis in the electronic cash letter record file. For example, the record of the reject/repair analysis can comprise a simple, binary indicator indicating that the reject/repair analysis was completed or failed to complete. Alternatively, the record of the reject/repair analysis can comprise detailed information regarding the reject/repair analysis completion and/or the results of the reject/repair analysis. For example, the record of the reject/repair analysis can comprise the date and/or time at which the reject/repair analysis was started and/or completed, the date and/or time at which the reject/repair analysis failed to complete, the reason(s) for which the reject/repair analysis failed to complete, the results of the reject/repair analysis, and a list of errors addressed during the reject/repair analysis. The tracking module 131 associates the record with the item in the electronic cash letter record file.

In step 375, the tracking module 131 determines whether to select another item for processing. For example, steps 340-370 can be repeated for each item to be processed. If another item is to be selected for processing, the method 300 branches back to step 340 to repeat steps 340-370 for another item. If not, the method 300 branches to step 380.

In step 380, the tracking module 131 determines whether to select another ICL for processing. For example, steps 320-375 can be repeated for each ICL to be processed. If another ICL is to be selected for processing, the method 300 branches back to step 320 to repeat steps 320-375 for another ICL. If not, the method 300 branches to step 385.

In step 385, the item(s) of the selected ICL(s) is (are) presented to the receiving institution 125 for payment. Step 385 is described in more detail below with reference to FIGS. 4A and 4B.

In step 390, the tracking module 131 monitors the processing progress of one or more of the ICL(s) received in step 305.

For example, the tracking module 131 can balance each received ICL by determining whether each item in the ICL has been presented in a corresponding, outgoing ICL. In exemplary embodiments, the tracking module 131 can balance a received ICL by determining that a total incoming value or total incoming number of all checks in the ICL matches a total outgoing value or total outgoing number of all checks from the ICL that are presented to one or more RIs via one or more outgoing ICLs. Step 390 is described in more detail below with reference to FIG. 5.

In step 395, the tracking module 131 tracks and reports the processing progress of one or more of the ICL(s) and/or items in the ICL(s) that were received in step 305. For example, the tracking module 131 can determine whether all items from each ICL processed correctly, and if not, at which processing point the ICL processing failed. In an exemplary embodiment, the tracking module 131 can determine the item(s) within an ICL that failed processing and the processing point at which those items failed. Step 395 is described in more detail below with reference to FIG. 6.

Figure 4A:
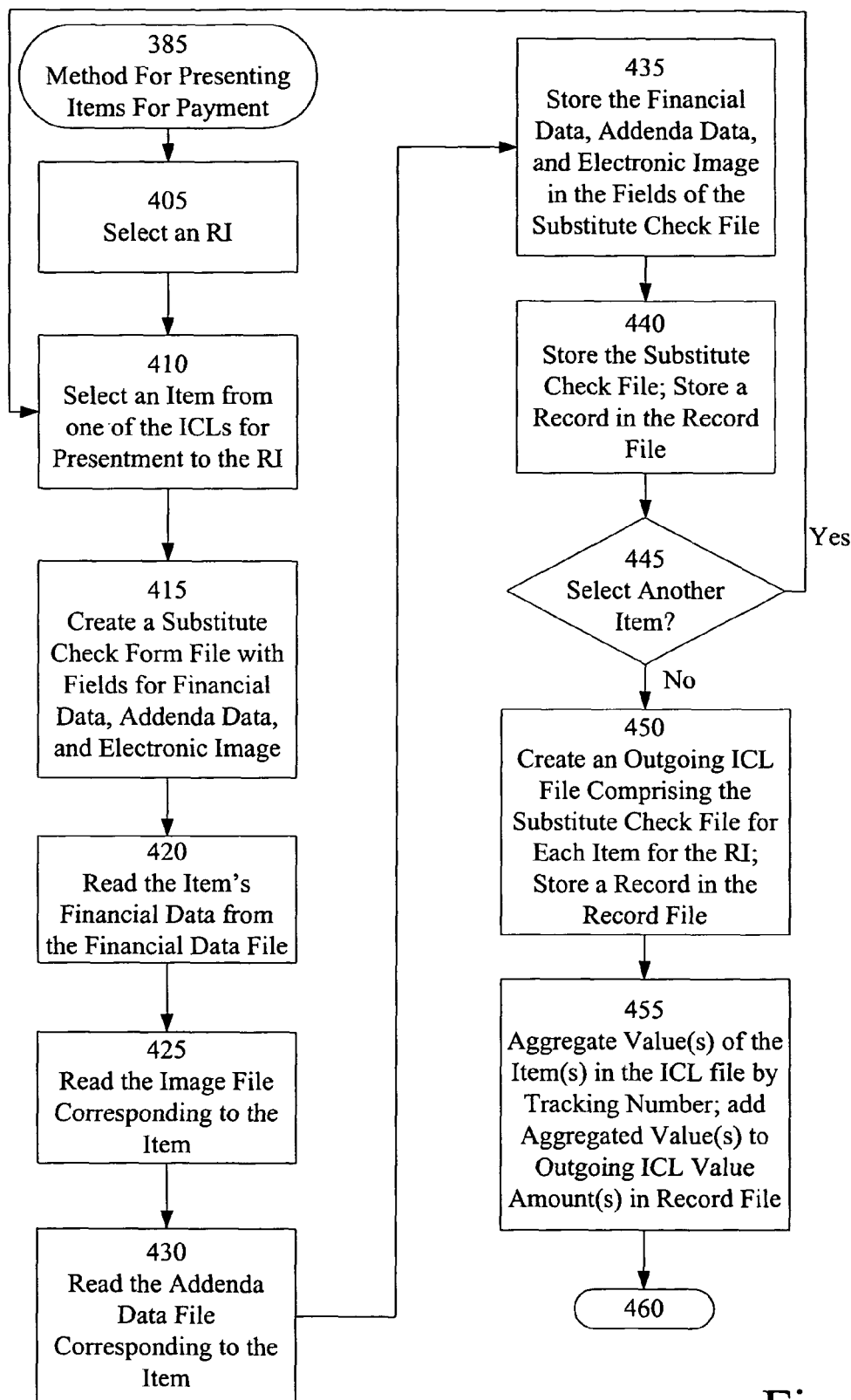
FIG. 4A and FIG. 4B are flow charts depicting a method for presenting an item for payment, according to an exemplary embodiment.
Figure 4B:
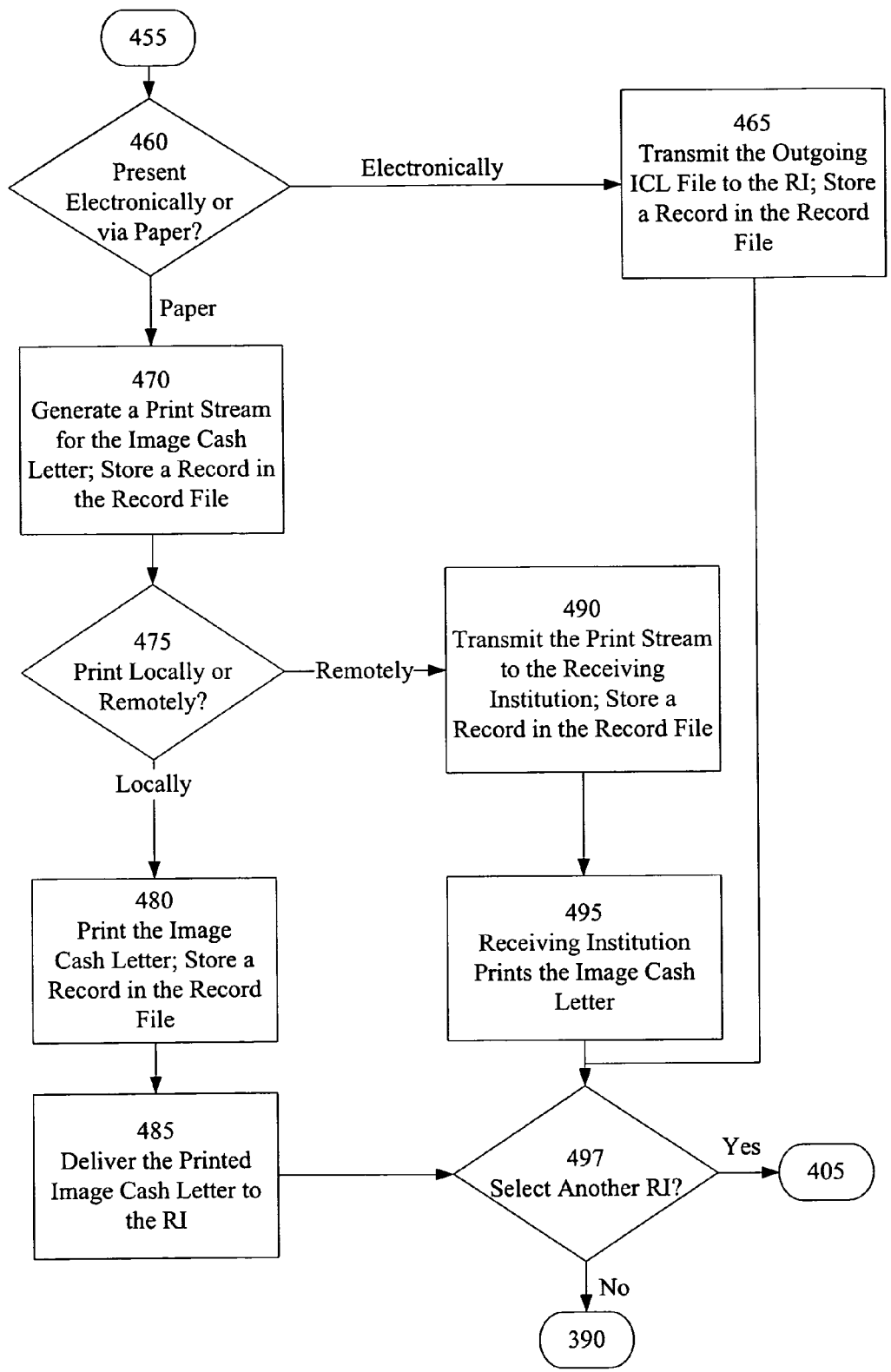

FIGS. 4A and 4B are flow charts depicting a method 385 for presenting an item for payment, according to an exemplary embodiment, as referred to in step 385 of FIG. 3B. The exemplary method 385 is merely illustrative and, in alternative embodiments, certain steps can be performed in a different order, performed in parallel with one another, or omitted entirely, and/or certain additional steps can be performed without departing from the scope and spirit of the invention. The method 385 is described below with reference to FIGS. 1 and 4.

In step 405, the check presentment module 116 selects a receiving institution 125 to which it will present one or more of the items received in step 305 for payment: In step 410, the check presentment module 116 selects one of the items for presentment to the selected receiving institution 125. The check presentment module 116 generates a substitute check form file with fields for the selected item's financial data, addenda data, and electronic image(s) in step 415. By entering the financial data, addenda data, and electronic image(s) into the appropriate fields, the check presentment module 116 can create a substitute check file that can be used to present a substitute check and/or an ICL to the receiving institution 125.

In step 420, the check presentment module 116 reads the item's financial data from its financial data file. In step 425, the check presentment module 116 identifies the image file(s) corresponding to the selected item. For example, the check presentment module 116 can identify the image file(s) with the same file name, item sequence number, or identification number as the selected item. In step 430, the check presentment module 116 identifies the addenda data file(s) corresponding to the selected item. For example, the check presentment module 116 can identify the addenda data file(s) with the same file name, item sequence number, or identification number as the selected item.

In step 435, the check presentment module 116 stores the item's financial data from the financial data file, the item's addenda data from the identified addenda data file(s), and the item's electronic image(s) from the identified image file(s) in the appropriate fields of the substitute check file. In step 440, the check presentment module 116 stores the substitute check file in the substitute check database 108.

The tracking module 131 also stores a record of the substitute check file storage in the electronic cash letter record file, in step 440. For example, the record of the substitute check file storage can comprise a simple, binary indicator indicating that the substitute check file storage was completed or failed to complete. Alternatively, the record of the substitute check file storage can comprise detailed information regarding the substitute check file storage, such as the date and/or time at which the substitute check file was created, the date and/or time at which the substitute check file storage occurred, the date and/or time at which the substitute check file creation/storage failed, the reason(s) for which the substitute check file creation/storage failed, and the name of the stored substitute check file. The tracking module 131 associates the record with the item in the electronic cash letter record file.

In one exemplary embodiment, the tracking module 131 can store a record of the substitute check file creation in the electronic cash letter record file. For example, the record of the substitute check file creation can comprise a simple, binary indicator indicating that the substitute check file was created or that the check presentment module 116 failed to create the substitute check file. Alternatively, the record of the substitute check file creation can comprise detailed information regarding the substitute check file creation, such as the date and/or time at which the substitute check file was created, the date and/or time that the check presentment module 116 failed to create the substitute check file, the reason(s) for which the check presentment module 116 failed to create the substitute check file, and the name of the created substitute check file. The tracking module 131 can associate the record with the item in the electronic cash letter record file.

In step 445, the check presentment module 116 determines whether to select another item for presentment to the receiving institution 125. For example, steps 410-440 can be repeated for each item to be presented to the receiving institution 125, whereby the selected items can be presented to the receiving institution 125 at the same time. If another item is to be selected for presentment to the receiving institution 125, the method 385 branches back to step 410 to repeat steps 410-440 for another item. If not, the method 385 branches to step 450.

In step 450, the check presentment module 116 creates an outgoing ICL comprising the corresponding substitute check files for each selected item. The outgoing ICL can further comprise a series of addenda and records related to the selected item(s). For example, the outgoing ICL can comprise an addendum comprising information about a bank of first deposit. In addition, for each bundle of substitute checks in the outgoing ICL, the outgoing ICL can include a bundle summary control record comprising information about the bundle. For example, the bundle summary control record can comprise a bundle identification number, the number of items (substitute check files) in the bundle, the value of each of the items in the bundle, and the total value of all the items in the bundle. The outgoing ICL also can comprise a ICL control record comprising information about the origin and destination of the outgoing ICL, and a cash letter bundle summary control record comprising a summary of all bundle summary control records in the outgoing ICL.

To create the outgoing ICL in an exemplary embodiment, the check presentment module 116 can organize the substitute check files (or items) into at least one bundle. Each bundle can comprise information regarding one or more substitute checks. The check presentment module 116 can read information regarding the substitute checks from the financial data files, addenda data files, image files, and/or substitute check files corresponding to the substitute checks. Then, the check presentment module 116 can store certain of the read information into appropriate record fields of the outgoing ICL.

The check presentment module 116 also can generate and enter into appropriate fields of the ICL information regarding the bundle(s). For example, for each bundle, the check presentment module 116 can sum the total number of items in the bundle and the total value of all items in the bundle and can store the total number of items, the total value of all items, and the value of each item in the bundle summary control record corresponding to the bundle. Similarly, the check presentment module 116 can sum the total value of all the items in all of the substitute check bundles (or the total value of all bundles) and can store the total value amount in the cash letter bundle summary control record of the outgoing ICL file.

The tracking module 131 stores a record of the outgoing ICL creation in the electronic cash letter record file. For example, the record of the ICL creation can comprise a simple, binary indicator indicating that the ICL was created or that the check presentment module 116 failed to create the ICL. Alternatively, the record of the ICL creation can comprise detailed information regarding the ICL creation, such as the date and/or time at which the ICL was created, the date and/or time at which the check presentment module 116 failed to create the ICL, and the reason(s) for which the check presentment module 116 failed to create the ICL. The tracking module 131 associates the record with each item included in the created ICL in the electronic cash letter record file.

In step 455, the tracking module 131 aggregates the values of the items in the created ICL by tracking number. For each tracking number, the tracking module 131 adds the aggregated value to the outgoing ICL value amount corresponding to the tracking number. Thus, the outgoing ICL value amount will comprise the total value of the items received in the ICL associated with the tracking number that have been processed for presentment in the created ICL. For example, as described below in connection with steps 515-540 (FIG. 5), the tracking module 131 can determine whether all the items in the incoming ICL processed correctly based on whether the outgoing ICL value amount equals the incoming ICL value amount. If the amounts are equal, then all of the items processed correctly. If not, then at least one of the items has not finished processing or has not been processed correctly.

In an alternative exemplary embodiment of step 455, the tracking module 131 can count the number of the items in the created ICL by tracking number. For each tracking number, the tracking module 131 can add the number of items to the outgoing ICL item count corresponding to the tracking number. Thus, the outgoing ICL item count will comprise the total number of the items received in the ICL associated with the tracking number that have been processed for presentment in the created ICL. For example, as described below in connection with steps 515-540 (FIG. 5), the tracking module 131 can determine whether all the items in the incoming ICL processed correctly based on whether the outgoing ICL item count equals the incoming ICL item count. If the counts are equal, then all of the items processed correctly. If not, then at least one of the items has not finished processing or has not been processed correctly.

In step 460, the check presentment module 116 determines whether to present the outgoing ICL electronically or via paper. If the outgoing ICL is to be presented electronically, the method 385 branches to step 465. In step 465, the check presentment module 116 electronically transmits the outgoing ICL file to an RI computer 126 of the receiving institution 125, e.g., via a network (not shown).

The tracking module 131 stores a record of the outgoing ICL transmission in the electronic cash letter record file. For example, the record of the outgoing ICL transmission can comprise a simple, binary indicator indicating that the outgoing ICL was transmitted or that the check presentment module 116 failed to transmit the outgoing ICL. Alternatively, the record of the outgoing ICL transmission can comprise detailed information regarding the outgoing ICL transmission, such as the date and/or time at which the outgoing ICL was transmitted, the date and/or time at which the outgoing ICL failed to transmit, the reason(s) for which the outgoing ICL failed to transmit, and the name and/or ABA number of the receiving institution 125. The tracking module 131 associates the record with each item included in the transmitted outgoing ICL in the electronic cash letter record file.

From step 465, the method 385 proceeds to step 497, discussed subsequently.

If the check presentment module 116 determines in step 460 to present the outgoing ICL via paper, the method 385 branches to step 470. In step 470, the check presentment module 116 generates a print stream by which the outgoing ICL can be printed onto paper. Certain exemplary systems and methods for generating such a print stream are described in co-pending U.S. patent application Ser. No. 11/362,344, entitled "Cash Letter Print Streams with Audit Data," filed on Feb. 22, 2006.

The tracking module 131 stores a record of the print stream generation in the electronic cash letter record file. For example, the record of the print stream generation can comprise a simple, binary indicator indicating that the print stream was generated or that the check presentment module 116 failed to generate the print stream. Alternatively, the record of the print stream generation can comprise detailed information regarding the print stream generation, such as the date and/or time at which the print steam was generated, the date and/or time at which the check presentment module 116 failed to generate the print stream, and the reason(s) for which the check presentment module 116 failed to generate the print stream. The tracking module 131 associates the record with each item included in the outgoing ICL of the print stream in the electronic cash letter record file.

In step 475, the check presentment module 116 determines whether to print the outgoing ICL locally or remotely. If the ICL is to be printed locally, the method 385 branches to step 480. In step 480, the check presentment module 116 prints the outgoing ICL via a printer 117. The check presentment module 116 prints the outgoing ICL using the print stream generated in step 470.

The tracking module 131 stores a record of the printing in the electronic cash letter record file. For example, the record of the printing can comprise a simple, binary indicator indicating that the ICL was printed or that the ICL failed to print. Alternatively, the record of the printing can comprise detailed information regarding the ICL printing, such as the date and/or time at which the printing was started, the date and/or time at which the printing completed, the date and/or time at which the printing failed, the reason(s) for which the printing failed, and the location of the printer 117. The tracking module 131 associates the record with each item included in the printed ICL in the electronic cash letter record file.

In step 485, an operator of the check processing site 105 collects the printed, outgoing ICL, including the paper substitute check(s), for delivery to the receiving institution 125. For example, the operator can mail or courier the printed, outgoing ICL to the receiving institution 125.

From step 485, the method 385 proceeds to step 497, discussed subsequently.

Referring back to step 475, if the check presentment module 116 determines in step 475 to print the outgoing ICL remotely, the method 385 branches to step 490. In step 490, the check presentment module 116 transmits the print stream generated in step 470 to the receiving institution 125, e.g., via a network (not shown). The tracking module 131 stores a record of the print stream transmission in the electronic cash letter record file. For example, the record of the print stream transmission can comprise a simple, binary indicator indicating that the print stream was transmitted or that the check presentment module 116 failed to transmit the print stream. Alternatively, the record of the print stream transmission can comprise detailed information regarding the print stream transmission, such as the date and/or time at which the print steam was transmitted, the date and/or time that the print stream transmission failed, the reason(s) for which the print stream transmission failed, the location of the RI Printer 127, and the name, location, and/or ABA number of the receiving institution 125. The tracking module 131 associates the record with each item included in the ICL of the print stream in the electronic cash letter record file. In step 495, the receiving institution 125 prints the outgoing ICL, including the paper substitute check(s), on the RI printer 127.

From step 495, the method 385 proceeds to step 497. In step 497, the check presentment module 116 determines whether to select another receiving institution 125 to which it will present one or more of the items received in step 305 for payment. For example, steps 405-495 can be repeated for each receiving institution 125 to which items will be presented. If another receiving institution 125 is to be selected, the method 385 branches back to step 405 to repeat steps 405-495 for another receiving institution. If not, the method 385 branches to step 390 (FIG. 3B).

Figure 5:
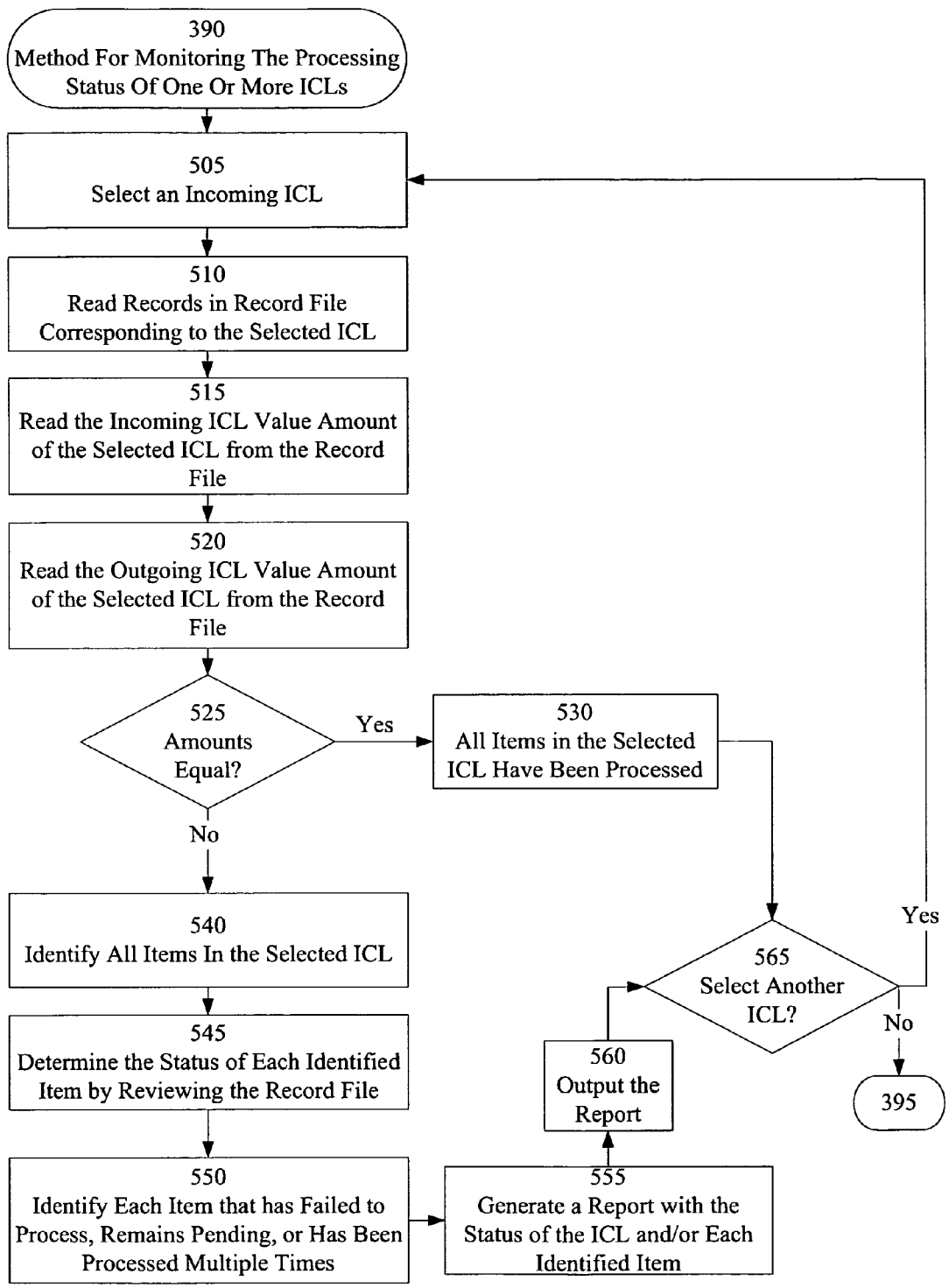
FIG. 5 is a flow chart depicting a method for monitoring the processing status of one or more image cash letters, according to an exemplary embodiment.

FIG. 5 is a flow chart depicting a method 390 for monitoring the processing status of one or more ICLs, according to an exemplary embodiment, as referred to in step 390 of FIG. 3B. The exemplary method 390 is merely illustrative and, in alternative embodiments, certain steps can be performed in a different order, performed in parallel with one another, or omitted entirely, and/or certain additional steps can be performed without departing from the scope and spirit of the invention. The method 390 is described below with reference to FIGS. 1 and 5.

In step 505, the tracking module 131 selects an incoming ICL for which it will monitor processing status. The tracking module 131 reads one or more records in the electronic cash letter record file corresponding to the selected incoming ICL in step 510. In particular, the tracking module 131 reads the incoming ICL value amount of the selected ICL from the electronic cash letter record file in step 515. In addition, the tracking module 131 reads the outgoing ICL value amount of the selected ICL from the electronic cash letter record file in step 520.

In step 525, the tracking module 131 determines whether the incoming ICL value amount equals the outgoing ICL value amount. If so, the method 390 branches to step 530, where the tracking module 131 determines that all items in the selected ICL have been processed. From step 530, the method 390 proceeds to step 565 discussed hereinafter. If the tracking module 131 determines in step 525 that the incoming ICL value amount does not equal the outgoing ICL value amount, then the tracking module 131 determines that at least one of the items in the selected ICL has failed to process, is still being processed, or has been processed multiple times, and the method 390 branches to step 540.

In an alternative exemplary embodiment of steps 515-525, the tracking module 131 can read the incoming ICL item count of the selected ICL from the electronic cash letter record file in step 515. In addition, the tracking module 131 can read the outgoing ICL item count of the selected ICL from the electronic cash letter record file in step 520. Then, in step 525, the tracking module 131 can determine whether the incoming ICL item count equals the outgoing ICL item count. If so, the method 390 branches to step 530, where the tracking module 131 determines that all items in the selected ICL have been processed. If the tracking module 131 determines in step 525 that the incoming ICL item count does not equal the outgoing ICL item count, then the tracking module 131 determines that at least one of the items in the selected ICL has failed to process, is still being processed, or has been processed multiple times, and the method 390 branches to step 540.

Based on the result of step 525, the tracking module 131 stores a record of the selected ICL's processing status in the electronic cash letter record file. For example, the record of the processing status can comprise a simple, binary indicator indicating that all items in the selected ICL have been processed or that at least one of the items in the selected ICL has failed to process, is still being processed, or has been processed multiple times. Alternatively, the record of the selected ICL's processing status can comprise detailed information regarding the status, such as the date and/or time at which the processing was started, the date and/or time at which the processing completed, the date and/or time at which the processing failed, and the reason(s) for which the processing failed. The tracking module 131 associates the record with the selected ICL and each item in the selected ICL in the electronic cash letter record file.

In step 540, the tracking module 131 identifies all of the items in the selected ICL. For example, the tracking module 131 can identify the items by reading a list of the items with the same tracking number as the ICL in the electronic cash letter record file. In step 545, the tracking module 131 determines the processing status of each identified item by reviewing the electronic cash letter record file. For example, if no record corresponding to a particular item in the electronic cash letter record file indicates that a substitute check file corresponding to the item was included in an outgoing ICL file, then the tracking module 131 can determine that the item has not yet been fully processed. In addition, if multiple records corresponding to a particular item indicate that a substitute check file corresponding to the item was included in an outgoing ICL file, then the tracking module 131 can determine that the item has been processed multiple times.

In particular, in step 550, the tracking module 131 identifies each item that has failed to process, remains pending, or has been processed multiple times. The tracking module 131 identifies the items based on the processing status determinations made in step 545. The tracking module 131 can read the information provided for each processing point for which a record of completion is stored, as described with reference to FIGS. 3-4. The information for each processing indicates whether the item has completed that processing point or failed to complete that processing point, including reasons why the item failed to complete the processing point. Accordingly, the method 390 can identify the processing point where an item failed processing and why that item failed that processing point.

In step 555, the tracking module 131 generates a report comprising the processing status of each item in the ICL. Alternatively, the tracking module 131 can generate a report comprising the processing status of each item identified in step 550. For example, the report can comprise a list of each item that has failed to process, remains pending, or has been processed multiple times. The report can further comprise detailed information regarding the processing status of each item, such as the last processing step that the item completed, the date and/or time that the item completed its last processing step, the date and/or time that the item failed to complete a processing step, the reason(s) for which the item failed to complete a processing step, the date and/or time that the item was received (in the electronic ICL file) at the check processor 109, and/or the dollar value of the item.

In step 560, the tracking module 131 outputs the generated report. For example, the tracking module 131 can display the generated report on a monitor (not shown) or other display device. Alternatively, the tracking module 131 can print the generated report on the printer 117 of the check processing site.

In step 565, the tracking module 131 determines whether to select another incoming ICL for which the tracking module 131 will monitor processing status. For example, steps 505-560 can be repeated for each incoming ICL to be monitored. If another incoming ICL is to be selected for monitoring, the method 390 branches back to step 505 to repeat steps 505-560 for another ICL. If not, the method 390 branches to step 395 (FIG. 3B).

In an alternative exemplary embodiment, the tracking module 131 can simultaneously monitor processing progress for multiple ICLs. The tracking module 131 can select the incoming ICLs and can perform steps 510-560 for each selected ICL. The tracking module 131 can generate a separate report for each ICL or a comprehensive report for multiple (or all) of the selected ICLs. For example, the report can comprise the number of selected ICLs which have completely processed, the number of selected ICLs with items that have failed to process, the number of selected ICLs with items that remain pending, and the number of selected ICLs with items that have been processed multiple times, including detailed information identifying the ICLs, items in the ICLs, and the processing status of each item and ICL.

Figure 6:
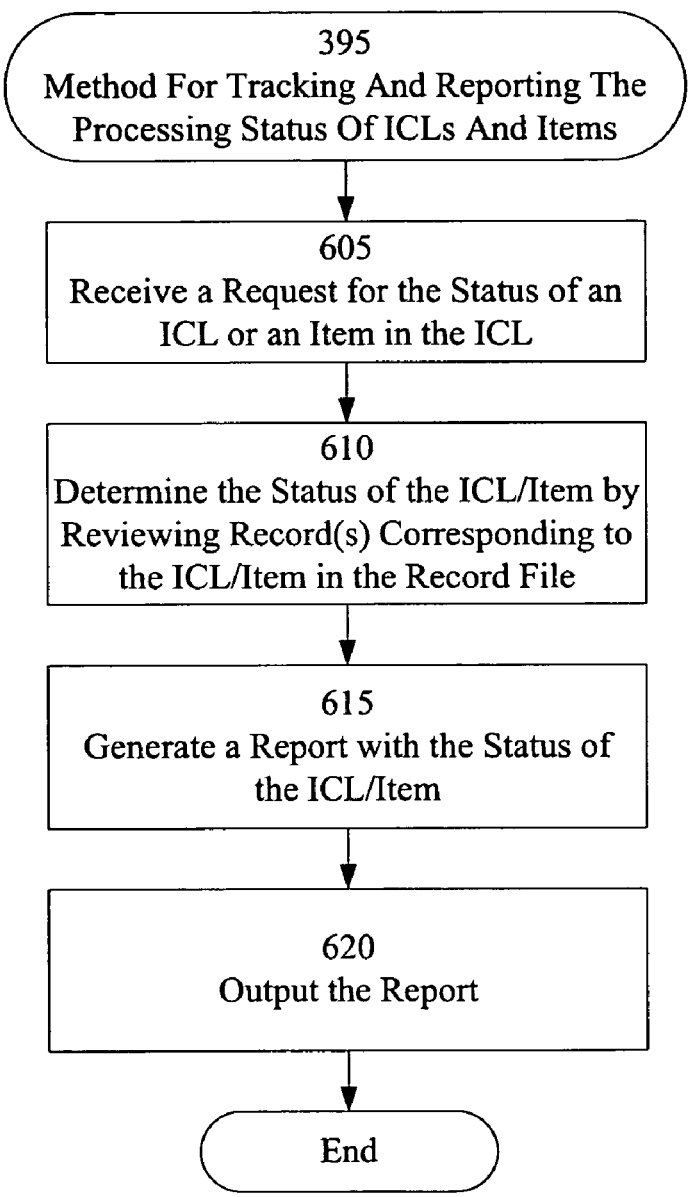
FIG. 6 is a flow chart depicting a method for tracking and reporting the processing status of one or more ICLs and/or items, according to an exemplary embodiment.

FIG. 6 is a flow chart depicting a method 395 for tracking and reporting the processing status of one or more ICLs and/or items, according to an exemplary embodiment, as referred to in step 395 of FIG. 3B. The exemplary method 395 is merely illustrative and, in alternative embodiments, certain steps can be performed in a different order, performed in parallel with one another, or omitted entirely, and/or certain additional steps can be performed without departing from the scope and spirit of the invention. The method 395 is described below with reference to FIGS. 1 and 6.

In step 605, the tracking module 131 receives a request for the processing status of an incoming ICL received in step 305 and/or an item in the incoming ICL. For example, the request can seek information regarding whether the ICL or item within the ICL has successfully processed, has failed to process, remains pending, or has been processed multiple times. The request can further seek detailed information regarding the status of the ICL or item, such as the last processing step that the ICL or item completed, the date and/or time that the ICL or item completed its last processing step, the date and/or time that the ICL or item failed to complete a processing step, the reason(s) for which the ICL or item failed to complete a processing step, the date and/or time that the ICL or item was received at the check processor 109 (in step 305), and/or the dollar value of the ICL or item.

In response to the request, the tracking module 131 determines the processing status of the ICL or item in step 610. The tracking module 131 makes that determination by reviewing one or more records corresponding to the ICL or item in the electronic cash letter record file. For example, if a record corresponding to the item in the electronic cash letter record file indicates that a substitute check file corresponding to the item was included in an outgoing ICL file, then the tracking module 131 can determine that the item has been fully processed. On the other hand, if none of the records corresponding to the item in the electronic cash letter record file indicate that a substitute check file corresponding to the item was included in an outgoing ICL file, then the tracking module 131 can determine that the item has not yet been fully processed. In addition, if multiple records corresponding to the item indicate that a substitute check file corresponding to the item was included in an outgoing ICL file, then the tracking module 131 can determine that the item has been processed multiple times. In an exemplary embodiment, the tracking module 131 can determine the status of the item using the method 390 discussed previously with reference to FIG. 5.

In an exemplary embodiment, the ICL's processing status can be based on the processing status of all items within the ICL. For example, if all items within an ICL have completed a certain processing step, then the status of the ICL can be identified as completed for that processing step. Alternatively, if all items within an ICL have not completed a certain processing step, then the status of the ICL can be identified as failed to process, remains pending, or has been processed multiple times for that processing step. For instance, if records corresponding to items in the ICL indicates that a substitute check file corresponding to each item was included in an outgoing ICL file, then the tracking module 131 can determine that the items in the ICL have been fully processed, and therefore the ICL has been fully processed. On the other hand, if one or more items from the ICL do not have corresponding records that indicate that a substitute check file corresponding to those items was included in an outgoing ICL file, then the tracking module 131 can determine that those items have not yet been fully processed, and therefore the ICL has not been fully processed. In addition, if multiple records corresponding one or more of the items in the ICL indicate that a substitute check file corresponding to those items was included in an outgoing ICL file, then the tracking module 131 can determine that those item have been processed multiple times, and therefore the ICL has an error in its processing. In an exemplary embodiment, the tracking module 131 can determine the status of the ICL and items in the ICL using the method 390 discussed previously with reference to FIG. 5.

In another alternative exemplary embodiment, the status of an ICL can be based on a threshold requirement for each of the items in the ICL. For example, if the number of items passing a certain processing point meets the threshold for that point, then the status of the ICL for that processing point can be "processed" or "completed." For instance, if the threshold is 90% for a certain processing point, then 90% of the items in the ICL must complete processing at the specified point for the status of the ICL to be considered "completed" for that processing point. The threshold for each processing point can be established based on a desired result established by the user.

In step 615, the tracking module 131 generates a report comprising the processing status of the ICL and/or item. For example, for an item, the report can indicate whether the item has been processed, has failed to process, remains pending, or has been processed multiple times. The report can further comprise detailed information regarding the processing status of the item, such as the last processing step that the item completed, the date and/or time that the item completed its last processing step, the date and/or time that the item failed to complete a processing step, the reason(s) for which the item failed to complete a processing step, the date and/or time that the item was received (in the electronic ICL file) at the check processor 109 (in step 305), and/or the dollar value of the item. For the status of an ICL, the report can indicate whether the items in the ICL have been processed, have failed to process, remain pending, or have been processed multiple times. The report can further comprise detailed information regarding the processing status of the items in the ICL, such as the last processing step that the items completed, the date and/or time that the items completed its last processing step, the date and/or time that the items failed to complete a processing step, the reason(s) for which the items failed to complete a processing step, the date and/or time that the items in the ICL were received at the check processor 109 (in step 305), and/or the dollar value of the items in the ICL.

In step 620, the tracking module 131 outputs the report. For example, the tracking module 131 can display the report on a monitor (not shown) or other display device. Alternatively, the tracking module 131 can print the generated report on the printer 117 of the check processing site. From step 620, the method 395 ends.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for tracking an electronic check processing status of an image cash letter ("ICL") item, comprising the steps of:

receiving an ICL comprising a plurality of ICL items for electronic check processing, each of the ICL items having an individual value;

for each ICL item, processing the ICL item by performing at least one electronic check processing event in connection with the item;

for each electronic check processing event, creating, by a tracking module, a record comprising information related to a status of the electronic check processing event with respect to the ICL item;

associating, by the tracking module, each record with the item; and determining, by the tracking module, the status of the item based on the information stored in at least one record created by the tracking module and associated with the item;

identifying, by the tracking module, an incoming ICL value amount comprising a sum of the individual values of the items;

identifying, by the tracking module, an outgoing ICL value amount comprising a sum of the individual values of all items in the ICL that have a status of having been presented for payment;

determining, by the tracking module, whether all items in the ICL have been presented for payment by determining whether the incoming ICL value amount equals the outgoing ICL value amount; and outputting, by the tracking module, a report comprising information regarding the ICL in response to determining that not all of the items in the ICL have been presented for payment, wherein the tracking module is implemented in a computer system that comprises instructions stored in a machine-readable medium and a processor that executes the instructions.

2. The method according to claim 1, wherein the at least one electronic check processing event comprises at least one of storing an image corresponding to the item, storing financial data corresponding to the item, storing addenda data corresponding to the item, conducting a reject/repair analysis of the financial data, creating a substitute check file corresponding to the item, creating a new ICL comprising the substitute check file, and presenting the item to a receiving institution for payment.

3. The method according to claim 1, wherein the step of associating each record with the item comprises the steps of:
associating an identifier with the item; and
associating the identifier with each record.

4. The method according to claim 1, wherein the status of the item comprises one of processed, failed to process, pending, and processed multiple times.

5. The method according to claim 1, wherein the step of creating a record comprising information related to a status of the electronic check processing event comprises the step of storing at least one of a date on which the electronic check processing event was performed and a time at which the electronic check processing event was performed.

6. The method according to claim 1, wherein the step of creating a record comprising information related to a status of the electronic check processing event comprises the step of storing an indicator indicating that the electronic check processing event was performed.

7. The method according to claim 1, wherein the step of creating a record comprising information related to a status of the electronic check processing event comprises the step of storing an indicator indicating that the electronic check processing event resulted in a processing failure.

8. The method according to claim 1, further comprising the step of determining that all items in the ICL have not been processed in response to a determination that the incoming ICL value amount does not equal the outgoing ICL value amount.

9. The method according to claim 8, further comprising the steps of:
identifying each of the items that has not been processed in response to a determination that all items in the ICL have not been processed; and
generating a report comprising status information for of each of the items that has not been processed.

10. A computer-implemented method for tracking and reporting an electronic check processing status of an image cash letter ("ICL") item, comprising the steps of:

receiving an ICL comprising a plurality of ICL items for electronic check processing, each of the ICL items having an individual value;

for each ICL item, tracking, by a tracking module, a status of the item during each of a plurality of electronic check processing events, the electronic check processing events comprising at least one of storing an image corresponding to the item, storing financial data corresponding to the item, storing addenda data corresponding to the item, conducting a reject/repair analysis of the financial data, creating a substitute check file corresponding to the item, creating a new ICL comprising the substitute check file, and presenting the item to a receiving institution for payment; and presenting, by the tracking module, the status of the item in response to a query to obtain the status of the item;

identifying, by the tracking module, an incoming ICL value amount comprising a sum of the individual values of the items;

identifying, by the tracking module, an outgoing ICL value amount comprising a sum of the individual values of all items in the ICL that have a status of having been presented for payment;

determining, by the tracking module, whether all items in the ICL have been presented for payment by determining whether the incoming ICL value amount equals the outgoing ICL value amount; and outputting, by the tracking module, a report comprising information regarding the ICL in response to determining that not all of the items in the ICL have been presented for payment, wherein the tracking module is implemented in a computer system that comprises instructions stored in a machine-readable medium and a processor that executes the instructions.

11. The method according to claim 10, wherein the step of receiving the ICL comprises the step of receiving an electronic image cash letter file comprising the ICL.

12. The method according to claim 10, wherein the status of the item for each of the electronic check processing events comprises one of processed, failed to process, pending, and processed multiple times.

13. The method according to claim 10, wherein the step of tracking the status of the item during each of the plurality of electronic check processing events comprises the steps of:

for each electronic check processing event, creating a record comprising information related to the status of the item for the particular electronic check processing event;

associating each record with the item; and determining the status of the item based on the information stored in at least one record.

14. The method according to claim 13, wherein the step of associating each record with the item comprises the steps of:

associating an identifier with the item; and associating the identifier with each record.

15. The method according to claim 13, wherein the step of creating a record comprising information related to the electronic check processing event comprises the step of storing at least one of a date on which the electronic check processing event was performed and a time at which the electronic check processing event was performed.

16. The method according to claim 13, wherein the step of creating a record comprising information related to the electronic check processing event comprises the step of storing an indicator indicating that the electronic check processing event was performed.

17. The method according to claim 13, wherein the step of creating a record comprising information related to the electronic check processing event comprises the step of storing an indicator indicating that the electronic check processing event resulted in a processing failure in a data file.

18. The method according to claim 10, further comprising the step of determining that all items in the ICL have not been processed in response to a determination that the incoming ICL value amount does not equal the outgoing ICL value amount.

19. The method according to claim 18, further comprising the steps of:

identifying each of the items that has not been processed in response to a determination that all items in the ICL have not been processed; and generating a report comprising status information for of each of the items that has not been processed.

20. A computer-implemented method for tracking an electronic check processing status of an image cash letter ("ICL") comprising a plurality of ICL items, comprising the steps of:

receiving the ICL comprising the plurality of ICL items, each of the ICL items having an individual value;

associating each of the items with the ICL;

processing the ICL by performing at least one electronic check processing event in connection with each of the items;

for each electronic check processing event, creating, by a tracking module, a record comprising information related to a status of the electronic check processing event with respect to each of the items;

associating, by the tracking module, each record with a corresponding one of the items;

identifying, by the tracking module, an incoming ICL value amount comprising a sum of the individual values of the items;

identifying, by the tracking module, an outgoing ICL value amount comprising a sum of the individual values of all items in the ICL that have been presented for payment;

determining, by the tracking module, whether all items in the ICL have been presented for payment by determining whether the incoming ICL value amount equals the outgoing ICL value amount;

outputting, by the tracking module, a report comprising information regarding the ICL in response to determining that not all of the items in the ICL have been presented for payment; and determining that all items in the ICL have been processed in response to a determination that the incoming ICL value amount equals the outgoing ICL value amount, wherein the tracking module is implemented in a computer system that comprises instructions stored in a machine-readable medium and a processor that executes the instructions.

21. The method according to claim 20, wherein the at least one electronic check processing event comprises, for each of the items, at least one of storing an image corresponding to the item, storing financial data corresponding to the item, storing addenda data corresponding to the item, conducting a reject/repair analysis of the financial data, creating a substitute check file corresponding to the item, creating a new ICL comprising the substitute check file, and presenting the item to a receiving institution for payment.

22. The method according to claim 20, wherein the step of associating each record with a corresponding one of the items comprises the steps of:

associating an identifier with the corresponding one of the items; and associating the identifier with each record associated with the corresponding one of the items.

23. The method according to claim 20, wherein the step of associating each of the items with the ICL comprises the steps of:

associating a tracking number with the ICL; and associating the tracking number with each of the items.

24. The method according to claim 20, wherein the status of the ICL comprises one of processed, failed to process, pending, and includes items that processed multiple times.

25. The method according to claim 20, wherein the step of creating a record comprising information related to the electronic check processing event comprises the step of storing at least one of a date on which the electronic check processing event was performed and a time at which the electronic check processing event was performed.

26. The method according to claim 20, wherein the step of creating a record comprising information related to the electronic check processing event comprises the step of storing an indicator indicating that the electronic check processing event was performed.

27. The method according to claim 20, wherein the step of creating a record comprising information related to the electronic check processing event comprises the step of storing an indicator indicating that the electronic check processing event resulted in a processing failure.

28. The method according to claim 20, further comprising the step of determining that all items in the ICL have not been processed in response to a determination that the incoming ICL value amount does not equal the outgoing ICL value amount.

29. The method according to claim 28, further comprising the steps of:
   identifying each of the items that has not been processed in response to a determination that all items in the ICL have not been processed; and
   generating a report comprising status information for of each of the items that has not been processed.

* * * * *